United States Patent
Chong et al.

(10) Patent No.: US 12,371,069 B1
(45) Date of Patent: Jul. 29, 2025

(54) COLLABORATIVE GUIDANCE FOR VEHICLE INTERACTIONS

(71) Applicant: Zoox, Inc., Foster City, CA (US)

(72) Inventors: Eunsuk Chong, Castro Valley, CA (US); Ravi Gogna, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 407 days.

(21) Appl. No.: 17/682,921

(22) Filed: Feb. 28, 2022

(51) Int. Cl.
*B60W 60/00* (2020.01)
*B60W 40/04* (2006.01)
*G06V 20/58* (2022.01)
*G06V 40/20* (2022.01)

(52) U.S. Cl.
CPC .......... *B60W 60/005* (2020.02); *B60W 40/04* (2013.01); *B60W 60/0011* (2020.02); *B60W 60/0017* (2020.02); *G06V 20/582* (2022.01); *G06V 40/28* (2022.01); *B60W 2420/403* (2013.01); *B60W 2554/4029* (2020.02); *B60W 2555/60* (2020.02); *B60W 2556/50* (2020.02)

(58) Field of Classification Search
None
See application file for complete search history.

(56) References Cited

U.S. PATENT DOCUMENTS

| | | | | |
|---|---|---|---|---|
| 10,386,836 B2* | 8/2019 | Lockwood | ........... | G05D 1/0027 |
| 10,717,448 B1* | 7/2020 | Seo | ........... | H04W 4/44 |
| 10,909,389 B2* | 2/2021 | Sivaraman | ........... | G08G 1/005 |
| 10,942,516 B2* | 3/2021 | Rastoll | ........... | G05D 1/0038 |
| 11,016,485 B2* | 5/2021 | Pedersen | ........... | G05D 1/0061 |
| 11,595,619 B1* | 2/2023 | Gate | ........... | G05D 1/0038 |
| 2020/0142395 A1* | 5/2020 | Delbari | ........... | B60W 10/10 |
| 2021/0197808 A1* | 7/2021 | Maeda | ........... | B60W 60/005 |

\* cited by examiner

*Primary Examiner* — James J Lee
*Assistant Examiner* — David Hatch
(74) *Attorney, Agent, or Firm* — Lee & Hayes, P.C.

(57) ABSTRACT

This disclosure is directed to techniques for collaborative driving during flagger interactions. For instance, a vehicle navigating along a path may detect a flagger using sensor data. Based on detecting the flagger, the vehicle may stop at a location that is at least a threshold distance from the flagger and also send the sensor data to one or more computing devices associated with a teleoperator. The vehicle may then receive a guidance from the one or more computing devices, where the guidance is to proceed past the location. In some examples, the vehicle receives the guidance when the teleoperator activates and holds an input device. Based on receiving the guidance, the vehicle may begin to navigate passed the location and by the flagger. In some examples, the vehicle continues to navigate as long as the teleoperator activates the input device.

20 Claims, 9 Drawing Sheets

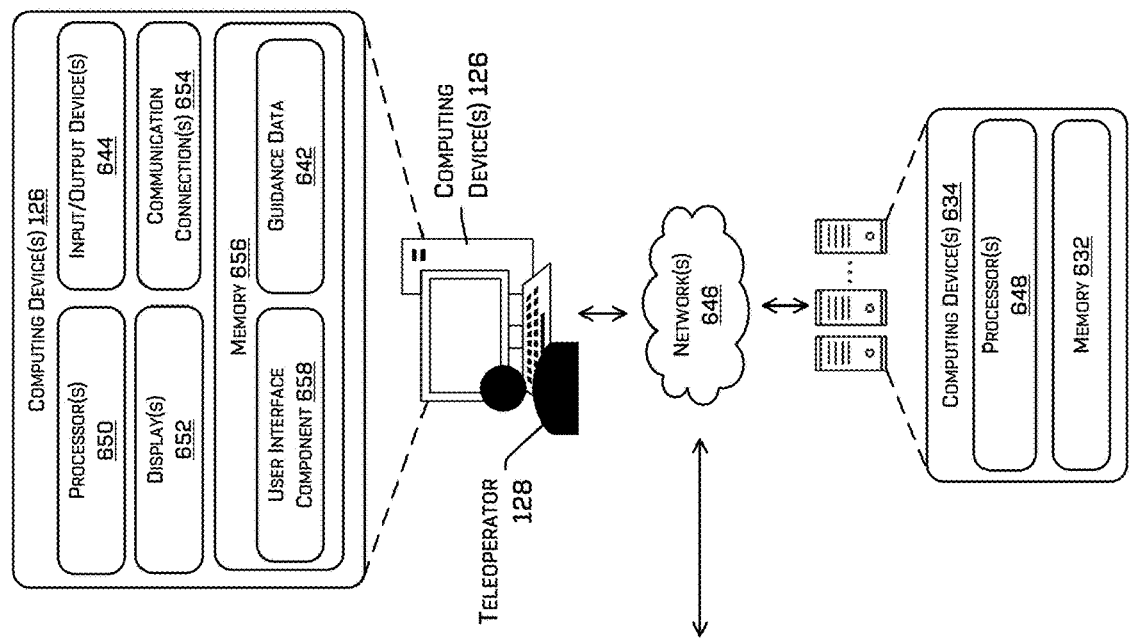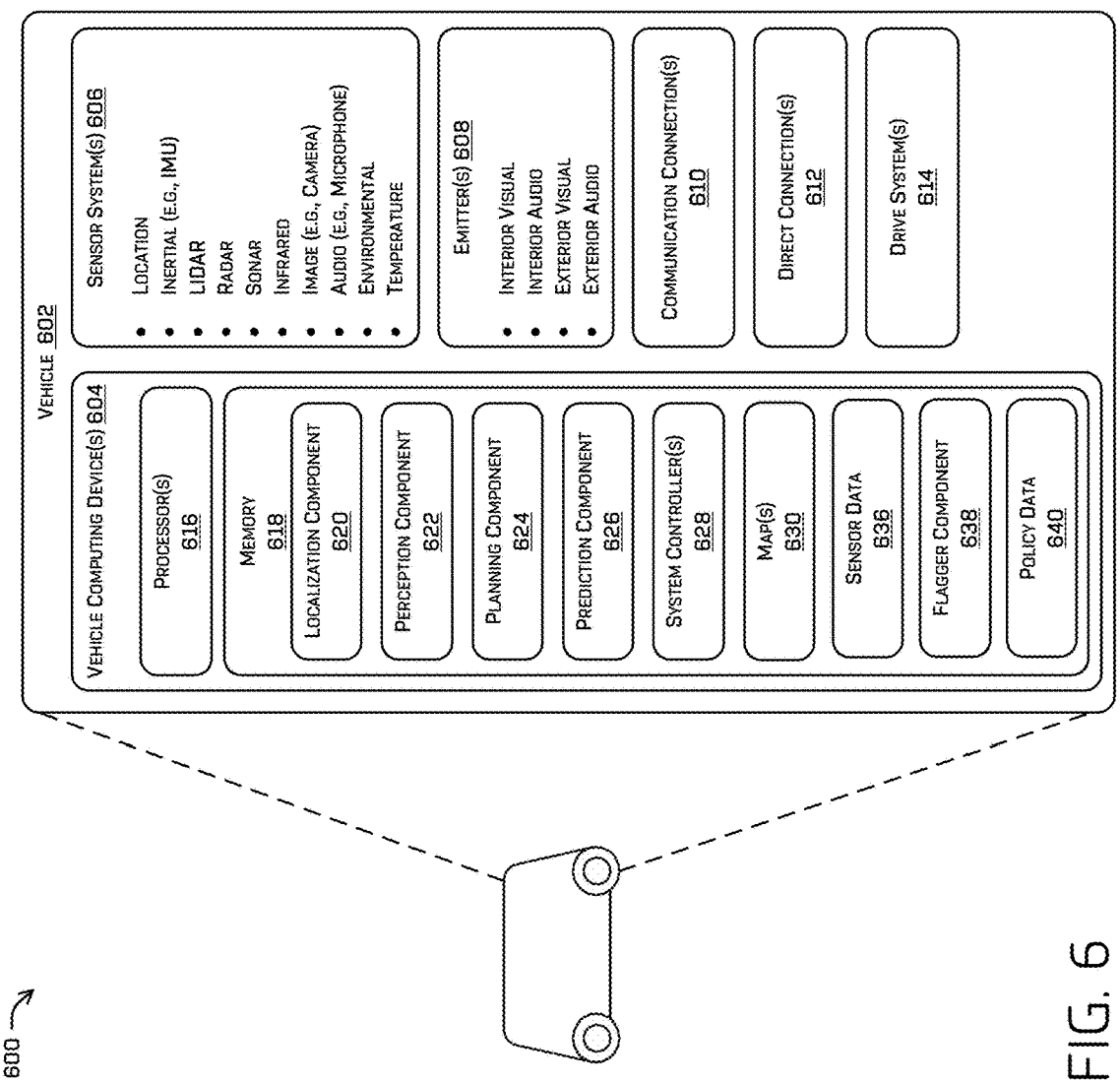
FIG. 6

COLLABORATIVE GUIDANCE FOR VEHICLE INTERACTIONS

BACKGROUND

An autonomous vehicle may use sensors to identify objects located within an environment in which the autonomous vehicle is navigating. The autonomous vehicle can then use the locations of the objects to determine actions for the autonomous vehicle to perform, such as navigating along a path through the environment. For example, the autonomous vehicle may determine the actions such that the autonomous vehicle navigates through the environment without being involved in a collision with the objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a block diagram of an example system for implementing the techniques described herein.

DETAILED DESCRIPTION

Figure 1A:
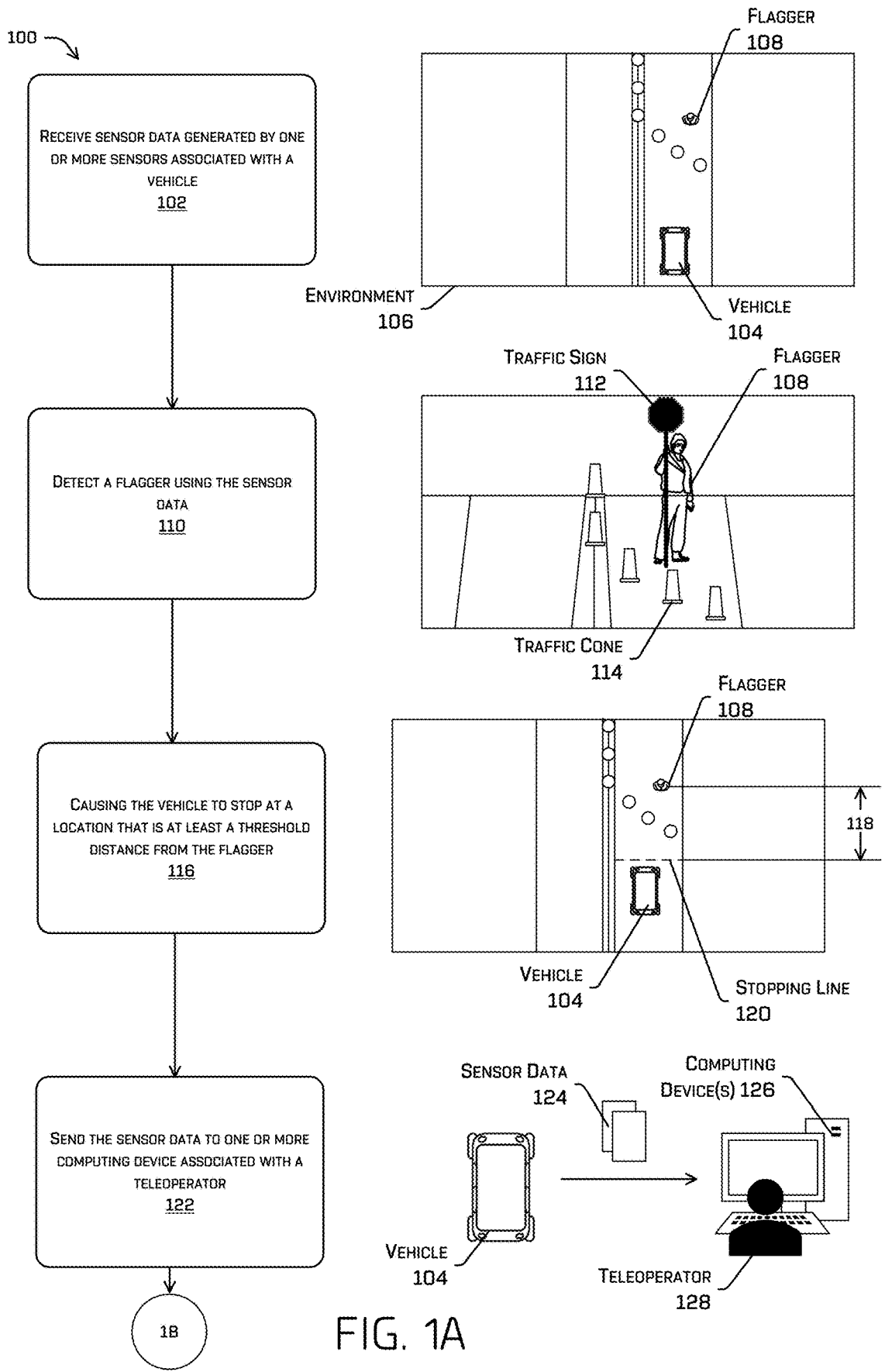
FIGS. 1A-1B illustrate an example process for collaboratively navigating a vehicle through a zone in which a flagger is directing traffic.

As discussed herein, an autonomous vehicle may use sensors to identify objects located within an environment in which the autonomous vehicle is navigating. The autonomous vehicle can then use locations of the objects to determine actions for the autonomous vehicle to perform, such as paths for navigating around the environment. However, in some circumstances, it may be beneficial for the autonomous vehicle to receive input or guidance from a teleoperator that is configured to assist the autonomous vehicle when navigating around the environment. For example, when the autonomous vehicle encounters a flagger, such as a construction worker or first responders (e.g., police officer, firefighters, etc.) that is directing traffic, it may be beneficial for the autonomous vehicle to receive assistance from the teleoperator while navigating through a zone for which the flagger is directing vehicles.

As such, techniques for collaborative driving for flagger interactions are discussed herein. For instance, a vehicle may receive sensor data from one or more sensors and then analyze the sensor data to detect a flagger located along a path of the vehicle. Based on identifying the flagger, the vehicle may send the sensor data to a computing device associated with a teleoperator and/or stop at a location that is at least a threshold distance from the flagger to await further instructions from the teleoperator on how to proceed. When the teleoperator determines that the vehicle should proceed, the computing device(s) may send guidance to the vehicle that assists the vehicle to navigate around the flagger. The guidance can include a selection of one or more policies for the vehicle to follow in conjunction with the flagger which may or may not be stored on the vehicle. In some examples, the vehicle continues to navigate around the flagger as long as the teleoperator continues to instruct the vehicle to proceed. In some examples, the teleoperator continues to instruct the vehicle to proceed by activating (e.g., pressing, turning, gesturing, etc.) an input device associated with the computing device(s) such that the vehicle may continue to operate under the new policy until communication with the teleoperator is lost or the teleoperator is no longer observing the vehicle. While navigating around the flagger, the vehicle may continue to generate and analyze sensor data in order to determine actions for safely navigating around the flagger. This way, the vehicle and the teleoperator collaboratively navigate through the zone for which the flagger is directing traffic.

For more detail, the vehicle may generate, using a sensor system associated with the vehicle, the sensor data representing an environment for which the vehicle is navigating. In some examples, the sensor data may include image data, lidar data, radar data, and/or other sensor data. Additionally, or alternatively, in some examples, the sensor data may include key point data associated with the environment, as described in U.S. patent application Ser. No. 17/246,016, which is incorporated herein by reference in its entirety and for all purposes. The vehicle may then analyze the sensor data in order to determine one or more attributes associated with a person located within the environment. In some examples, the vehicle analyzes the sensor data by inputting the sensor data into a machine-learned model (e.g., of a perception component) that is configured to determine the attribute(s). The attribute(s) may indicate one or more of a classification of the person (e.g., a flagger), an activity the person is engaged in (e.g., directing traffic, holding traffic sign, etc.), and/or the like.

For example, the vehicle may input the sensor data into the machine-learned model and then receive, from the machine-learned model, output indicating the attribute(s) of a person. The output may indicate that a classification of the person includes a flagger. As described herein, when a flagger is a person, the flagger may include, but is not limited to, a first responder, a construction worker, and/or any other person that is directing traffic. In some examples, the flagger may be authorized to direct traffic, such as when the flagger is a police officer or a construction worker. In other examples, the flagger may not be authorized to direct traffic, such as when the flagger is a person that is otherwise directing traffic (e.g., a bystander directing traffic around an accident before emergency personnel arrive, etc.). Additionally, along with the classification, the output may indicate an activity that the flagger is performing. As described herein, the activity may include, but is not limited to, directing traffic, holding a traffic sign, performing one or more gestures, and/or the like.

In some examples, the vehicle (e.g., the machine-learned component of the vehicle) may be configured to determine that the person is a flagger based at least in part on the environment in which the vehicle is navigating. For example, the vehicle may determine that the person is a flagger based on objects that are located within the environment in which the person is located. For instance, if the vehicle determines that the sensor data represents one or more police cars, fire trucks, or ambulances, then the vehicle may use that determination to further determine that the person is a police officer, fire fighter, or emergency personnel working as a flagger. Additionally, if the vehicle determines that the sensor data represents construction equipment (e.g., machines, construction cones, barriers, etc.), then the vehicle may use that determination to further determine that the person is a construction worker working as a flagger. For another example, the vehicle may determine that the person is a flagger using map data associated with the environment. For instance, if the map data indicates that construction is occurring around the location of the vehicle, then the vehicle may again use that determination to determine that the person is a construction worker.

In some examples, the vehicle may determine that the person is a flagger based at least in part on information indicative of an accident in the vicinity (e.g., map data indicating the accident, traffic reports indicating the incident, sensor data detecting sirens and/or flashing lights in the vicinity, etc.). Additionally, in some examples, the vehicle may determine that the person is a flagger based on data received from other vehicles. For example, another vehicle that has previously identified the flagger within the environment may send, to one or more vehicles (e.g., via computing device(s)), data that identifies the flagger, the location of the flagger, the type of flagger, and/or the like.

While the examples above describe the flagger as being a person within the environment, in other examples, the flagger may include other types of objects. For instance, the flagger may include a traffic sign, traffic cones, another vehicle, and/or the like that provides directions to the vehicle. For example, the flagger may include a traffic sign that switches between two different states, such as a first state of "SLOW" and a second state of "STOP." For another example, the flagger may again include a traffic sign that switches between two different states, such as a first state of "PROCEED LEFT" and a second state of "PROCEED RIGHT."

Based on determining that the person is a flagger, the vehicle may perform one or more actions. For example, before detecting the flagger, the vehicle may have been operating under a given set of rules (e.g., policies) that assume normal driving conditions. However, when the vehicle encounters the flagger, at least some of the set of rules may be superseded in order to change how the vehicle navigates through a zone for which the flagger is directing traffic. In some examples, the vehicle may use one or more policies associated with flaggers in order to navigate through the zone. For example, the vehicle may store a first policy that causes the vehicle to stop at least a threshold distance from flaggers. As described herein, the threshold distance may include, but is not limited to, 2 meter, 4 meters, 8 meters, 10 meters, and/or any other distance. As such, based on the first policy, the vehicle may identify a stopping line that is at least the threshold distance from the location of the flagger. A rule of the first policy may prevent the vehicle from crossing the stopping line without further guidance from a teleoperator, for example. The vehicle may then automatically stop at the stopping line in order to increase the overall safety for the flagger.

For another example, the vehicle may store a second policy that causes the vehicle to navigate according to different states of a traffic sign, such as when the flagger is a construction worker holding the traffic sign. The states of the traffic sign may include, but are not limited to, stop, slow, proceed left, proceed right, and/or the like. Similar to the first policy, a rule of the second policy may still prevent the vehicle from proceeding according to the states of the traffic sign until receiving further guidance from the teleoperator. For another example, the vehicle may store a third policy that causes the vehicle to navigate according to different gestures of the flagger, such as when the flagger is a police officer. The gestures of the flagger may include, but are not limited to, stop, slow, proceed left, proceed right, and/or the like. Again, similar to the first policy, a rule of the third policy may still prevent the vehicle from proceeding according to the gestures of the flagger until receiving further guidance from the teleoperator.

In some examples, the policies may be specific to the type of flagger and/or the situation associated with the flagger. For example, a fourth policy may be associated with police officers, a fifth policy may be associated with construction workers, and/or the like. This is because different types of flaggers tend to provide different types of instructions to vehicles when directing traffic (e.g., a construction worker normally uses a traffic sign while a police officer normally uses hand gestures). For another example, the sixth policy may be associated with situations that include roadwork while a seventh policy may be associated with situation in which police officers are directing traffic. This is because vehicles are sometimes required to break normal driving conditions when roadwork is occurring (e.g., the vehicle may need to navigate in the opposite, incoming traffic lane) while vehicles usually follow the normal driving conditions when police officers are directing the traffic (e.g., the police officers usually just instruct the vehicles when to proceed and when to stop). While these are just a few examples of policies that the vehicle may follow when encountering a flagger, in other examples, the vehicle may follow additional and/or alternative policies.

Either before and/or after selecting the policy, the vehicle may send at least a portion of the sensor data to the computing device(s) associated with the teleoperator. In some examples, the vehicle sends additional data to the computing device(s), such as an indication of the person that the vehicle determined as including the flagger. The computing device(s) may then use the sensor data to present content to the teleoperator, such as in the form of a video, images, computer-generated representations, and/or other content depicting at least the flagger. In some examples, the teleoperator may then confirm whether the person is in fact an authorized flagger as opposed to a random person. For example, the vehicle may have initially performed the processes above to determine a probability that the person is the flagger. Based on the probability exceeding a threshold probability, the vehicle may determine that the person is likely a flagger. As such, the teleoperator may verify whether the person is in fact the flagger.

Additionally, when the person is verified as being an authorized flagger, the teleoperator may use the computing device(s) to collaboratively assist the vehicle to navigate through the zone for which the flagger is directing traffic. In some examples, the teleoperator collaboratively assists the vehicle to navigate in order to increase the overall safety for the flagger, the vehicle, occupants of the vehicle, for other persons, for other vehicles, and/or the like within the zone.

For example, while viewing the content, the teleoperator may determine that the vehicle should proceed based on the directions being provided by the flagger (e.g., the flagger may be holding a traffic sign that says "SLOW," the flagger may be waving the vehicle through the zone, etc.). As such, the teleoperator may input guidance into the computing device(s), where the guidance is for the vehicle to proceed (e.g., the guidance relaxes or temporarily updates the policy causing the vehicle to proceed). In some examples, to input the guidance, the teleoperator may continuously activate an input device, such as by activating a button on a keyboard of the computing device(s). While activating the input device, the computing device(s) may continue to send guidance to the vehicle, where the guidance provide guidance (e.g., relaxing or temporarily overriding the policy to stop) to the vehicle enabling the vehicle to proceed through the zone. However, if the teleoperator releases the input device, the computing device(s) then send an additional guidance to the vehicle, where the additional guidance causes the vehicle to no longer proceed through the zone and/or stop. In other words, the teleoperator may need to continuously provide the guidance to the vehicle in order for the vehicle to navigate through the zone.

For example, such as when the teleoperator initially activates the input device, the vehicle may receive guidance that causes the vehicle to proceed. Based on the guidance, the vehicle may begin to navigate past the stopping line that was determined using the policy. The vehicle may then continue to navigate through the zone as long as the teleoperator continually activates the input device. In some examples, the vehicle continues to receive guidance from the computing device(s) that cause the vehicle to proceed as long as the teleoperator continues to activate the input device (e.g., the vehicle receives continuous guidance). For example, the vehicle may receive the guidance at the elapse of time intervals, such as every millisecond, fifty milliseconds, second, two seconds, and/or any other time interval. Additionally to, or alternatively from receiving the continuous guidance, in some examples, the vehicle receives updated guidance to no longer proceed from the computing device(s) if the teleoperator releases the input device. Based on receiving such updated guidance, the vehicle may then determine one more actions for safely stopping within the zone.

While receiving the guidance from the teleoperator, the vehicle may continue to receive sensor data and analyze the sensor data to determine one or more actions for safely navigating through the zone. For instance, the vehicle may determine the one or more actions in order to avoid a collision with an object (e.g., the flagger, another vehicle, etc.), follow traffic signs, and/or the like. For example, if the vehicle analyzes the sensor data and determines that an object is located along a path of the vehicle, the vehicle may perform one or more actions, such as stopping, in order to avoid the collision. For another example, if the vehicle analyzes the sensor data and determines that the situation associated with the flagger has changed, the vehicle may again perform one or more actions, such as stopping. As described herein, the situation associated with the flagger may change based on the flagger providing new directions for the vehicle. For example, the flagger may switch a traffic sign from a first state, such as "SLOW" to a second state, such as "STOP," or vice versa. For another example, the flagger may switch from performing a first gesture, such as waving the vehicle to proceed, to performing a second gesture, such as indicating that the vehicle should stop or vice versa.

In any of these examples, the vehicle may send the sensor data that caused the vehicle to perform the one or more actions to the computing device(s) associated with the teleoperator. In some examples, the vehicle may further send data indicating why the vehicle performed the one or more actions. For example, if the vehicle stopped because the situation with the flagger changed, then the vehicle may send data to the computing device(s) that indicates that the flagger switched the traffic sign from "SLOW" to "STOP." This way, the teleoperator is able to determine why the vehicle is performing one or more actions while navigating through the zone. Additionally, the teleoperator may provide additional commands or guidance to help the vehicle continue through the zone.

While the examples above describe the vehicle determining the path for how to proceed through the zone, in some examples, the teleoperator may provide additional commands or guidance for proceeding through the zone. For example, based on the situation associated with the flagger, the vehicle may be unable to determine how to proceed through the zone. As such, the teleoperator may input guidance that represents a path for the vehicle to navigate and/or a region within which the vehicle is to navigate in order to proceed through the zone. Based on receiving the guidance, the vehicle may then navigate according to the path and/or region. For example, if the flagger includes a construction worker that is directing the vehicle to navigate to a left of the construction worker, the vehicle may be unable to identify the directions being provided by the construction worker. As such, the teleoperator may input a path that includes navigating the vehicle to the left of the construction work, which the vehicle may then follow when navigating through the zone.

The techniques described herein may be implemented in a number of ways. Example implementations are provided below with reference to the following figures. Although discussed in the context of an autonomous vehicle, the methods, apparatuses, and systems described herein may be applied to a variety of systems and is not limited to autonomous vehicles. In another example, the techniques may be utilized in an aviation or nautical context, or in any system using sensor data. Additionally, the techniques described herein may be used with real data (e.g., captured using sensor(s)), simulated data (e.g., generated by a simulator), or any combination of the two.

Figure 1B:
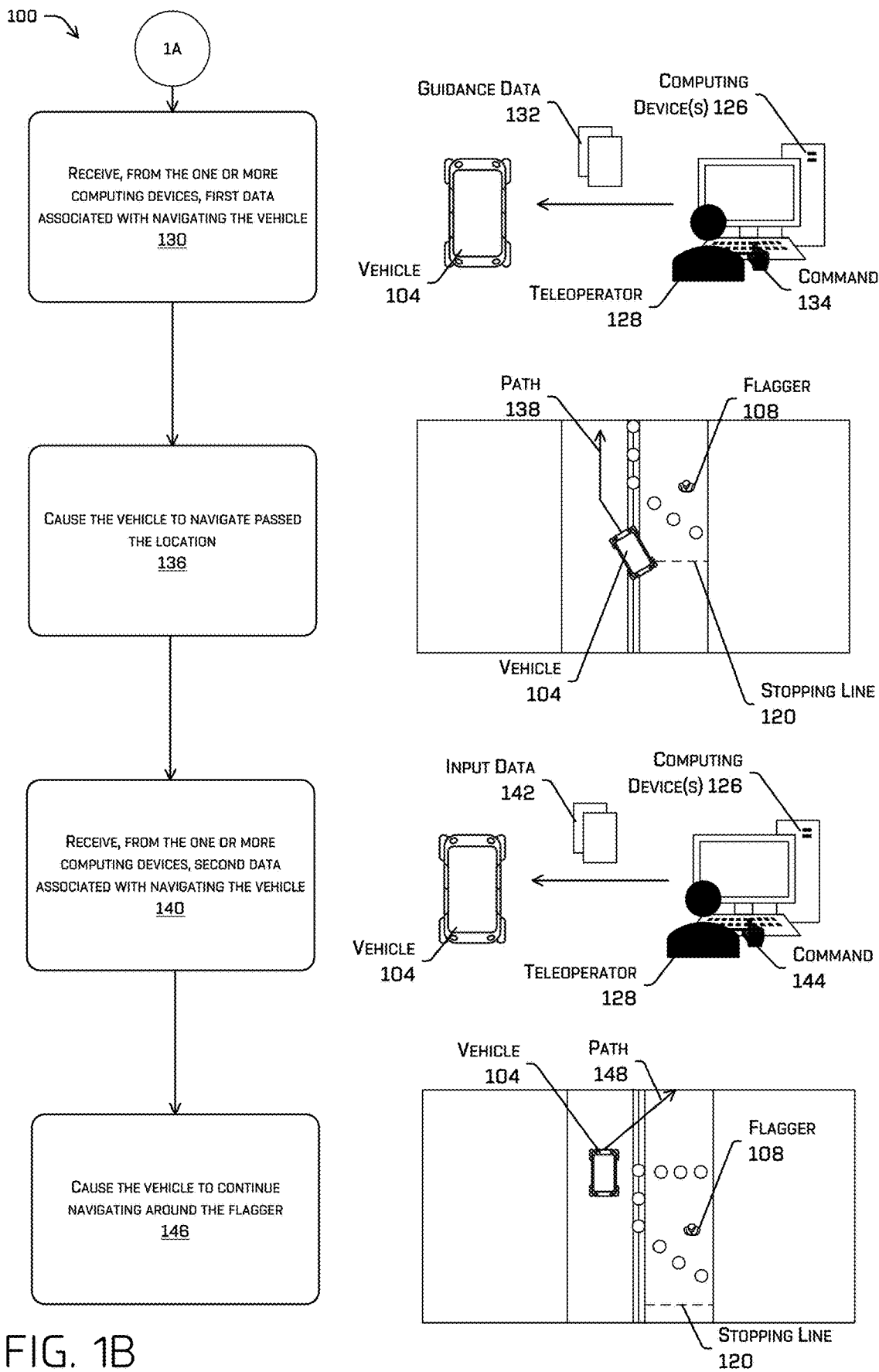

FIGS. 1A-1B are an example process 100 for collaboratively navigating a vehicle through a zone in which a flagger is directing traffic. At operation 102, the process 100 may include receiving sensor data generated by one or more sensors associated with a vehicle 104. For instance, the vehicle 104 may be navigating along a path that is through an environment 106 that includes a flagger 108 directing traffic. Before encountering the flagger 108, the vehicle 104 may be navigating according to a given set of rules (e.g., policies) that assume normal driving conditions. While navigating, the vehicle 104 may generate the sensor data using the one or more sensors. As described herein, the sensor data may include image data, lidar data, radar data, and/or the like that represents the environment 106 around the vehicle 104.

At operation 110, the process 100 may include detecting a flagger 108 using the sensor data. For instance, the vehicle 104 may analyze the sensor data using a machine-learned model in order to determine one or more attributes associated with the flagger 108. In some examples, the attribute(s) may include a classification indicating that the person is the flagger 108. In some examples, the attribute(s) may further indicate one or more actions that are being performed by the flagger. For example, and in the example of FIGS. 1A-1B, the action(s) may include the flagger 108 directing traffic and/or the flagger 108 holding a traffic sign 112.

In some examples, the vehicle 104 (e.g., the machine-learned model) may use additional features associated with the environment 106 when determining that the person is a flagger. For example, the machine-learned model may further analyze the sensor data and, based on the analysis, determine classifications associated with one or more other objects located within the environment 106. For instance, and in the example of FIGS. 1A-1B, the machine-learned model may determine that other objects located within the environment 106 include traffic cones 114 (although only one is labeled for clarity reasons) and the traffic sign 112. The machine-learned model may then use that determinations in order to further determine that the type of flagger 108 is a construction worker. This is because traffic cones and traffic signs are objects that are likely located in construction zones that includes construction worker flaggers.

While the example of FIGS. 1A-1B only includes other objects such as the traffic cones 114 and the traffic sign 112, in other examples, other objects may additionally include specific types of vehicles (e.g., tractors for construction workers, police cars for police officers, firetrucks for firefighters, etc.), other types of traffic signs (e.g., a traffic sign indicating that the vehicle 104 is approaching a construction zone, etc.), and/or any other type of object. Additionally, in other examples, the vehicle 104 may use map data associated with the environment 106 to determine that the person includes the flagger 108 and/or the construction worker. For example, the map data may indicate that a construction zone is located around the environment 106. As such, the machine-learned model may use further use the fact that the vehicle 104 is navigating near a construction zone in order to determine that the person is the flagger 108 and/or the construction worker.

Still, in some examples, the vehicle 104 may use additional techniques for identifying the flagger 108. For example, the vehicle 104 may initially determine that a probability that the person is the flagger 108 satisfies (e.g., is equal to or greater than) a threshold probability. The vehicle 104 may then send data to the computing device(s) associated with a teleoperator (described below). The teleoperator may then verify that the person is in fact the flagger 108. Based on the verification, the vehicle 104 may receive, from the computing device(s), data verifying that the person is the flagger 108.

At operation 116, the process 100 may include causing the vehicle 104 to stop at a location that is at least a threshold distance 118 from the flagger 108. For instance, the vehicle 104 may store a first policy that indicates that, when the vehicle 104 detects flaggers, the vehicle 104 is to stop at least the threshold distance 118 from the flaggers. As such, based on detecting the flagger 108, and using the first policy, the vehicle 104 may determine a stopping line 120 that is located the threshold distance 118 from the flagger 108. A rule associated with the first policy may cause the vehicle 104 to stop at the stopping line 120 until receiving guidance from a teleoperator.

Additionally, or alternatively, and in the example of FIGS. 1A-1B where the flagger is a construction worker, the vehicle 104 may store a second policy that causes the vehicle to navigate according to different states of the traffic sign 112. The states of the traffic sign 112 may include, but are not limited to, stop, slow, proceed left, proceed right, and/or the like. Similar to the first policy, a rule of the second policy may still prevent the vehicle 104 from proceeding according to the states of the traffic sign 112 until receiving further guidance from the teleoperator.

In some examples, the vehicle 104 selects the first policy and/or the second policy based on detecting that the person is the flagger 108. In some examples, the vehicle 104 selects the first policy and/or the second policy based on receiving, from the teleoperator, the verification that the person is the flagger 108. In some examples, the first policy and/or the second policy may be stored in the vehicle 104 such that the vehicle 104 is able to select the first policy and/or the second policy. However, in other examples, the vehicle 104 may receive the first policy and/or the second policy from the teleoperator once the teleoperator verifies that the person is in fact the flagger 108 (e.g., the teleoperator may select the policies for the vehicle 104).

While the example of FIGS. 1A-1B illustrate selecting the first policy and/or the second policy associated with construction workers, in other examples, the vehicle 104 and/or the teleoperator may select policies associated with other types of flaggers and/or for other types of situations. For example, and as described herein, the vehicle 104 may select a policy associated with police officers when the flagger 108 within the environment includes a police officer. For another example, the vehicle 104 may select a policy associated with traffic signs if the flagger 108 does not include a person, but just a traffic sign within the environment. Still, for another example, the vehicle 104 may select a policy associated with gestures if the flagger 108 is providing hand gestures instead of using the traffic sign 112. These different policies are described throughout the application.

Figure 2:
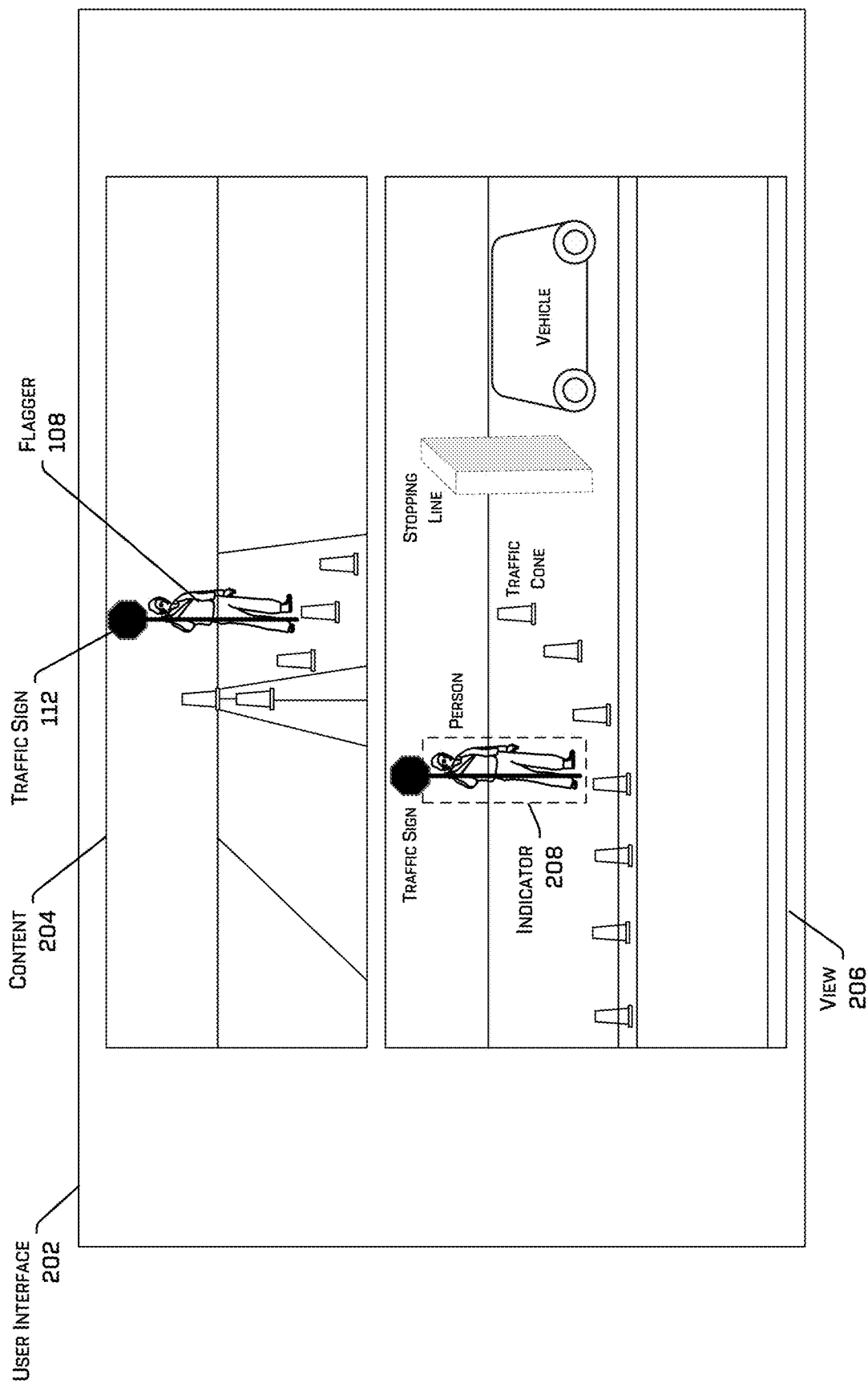
FIG. 2 illustrates an example of a user interface that a teleoperator may use to provide guidance to a vehicle.

At operation 122, the process 100 may include sending the sensor data 124 to one or more computing devices 126 associated with a teleoperator 128. For example, and as shown, the vehicle 104 sends the sensor data 124 to the computing device(s) 126. In some examples, the vehicle 104 further sends, to the computing device(s) 126, additional data indicating the person that the vehicle 104 determines is likely the flagger 108. The additional data may represent a bounding box associated with the flagger 108, a cropped image of the flagger 108, and/or any other information. The computing device(s) 126 may then use the sensor data 124 in order to present content associated with the environment 106 to the teleoperator 128, which is illustrated in the example of FIG. 2. While the example of FIGS. 1A-B illustrate the vehicle 104 as sending the sensor data 124 after selecting the policy and/or stopping, in other examples, the vehicle 104 may send the sensor data 124 before selecting the policy and/or stopping.

At operation 130, the process 100 may include receiving, from the computing device(s) 126, guidance data 132 associated with navigating the vehicle 104. For instance, the teleoperator 128 may initially analyze the content in order to verify that the person is the flagger 108. The teleoperator 128 may then further analyze the content to determine that the vehicle 104 should proceed through the environment 106. For example, the teleoperator 128 may determine that the traffic sign 112 indicates "SLOW." Based on the determination, the teleoperator 128 may input a command for guiding the vehicle 104 to proceed through the environment 106. In the example of FIGS. 1A-1B, the teleoperator 128 inputs the command by activating (e.g., pressing) an input device associated with the computing device(s) 126, which is represented by 134. The computing device(s) 126 may then send the guidance data 132 to the vehicle 104.

In some examples, the guidance data 132 may cause the vehicle 104 to update the one or more selected policies in order to navigate. For example, at operation 136, the process

100 may include causing the vehicle 104 to navigate passed the location. For instance, based on receiving the guidance data 132, the vehicle 104 may determine to proceed through the environment 106 by initially navigating passed the stopping line 120. In other words, the guidance data 132 may cause the vehicle 104 to update the first policy that initially caused the vehicle 104 to stop at the location that is the threshold distance from the flagger 108. In some examples, the vehicle 104 analyzes additional sensor data to determine a path 138 to follow around the flagger 108 and through the zone. In other examples, the teleoperator 128 may provide further inputs indicating the path 138 that the vehicle 104 is to follow through the zone.

While the example of FIGS. 1A-1B illustrate the vehicle 104 as initially stopping at the stopping line 120, in other examples, the vehicle 104 may not stop. For example, before the vehicle 104 arrives at the stopping line 120, the vehicle 104 may receive the guidance data 132 from the computing device(s) 126. Based on receiving the guidance data 132, the vehicle 104 may thus continue passed the stopping line 120 without stopping.

At operation 140, the process 100 may include receiving, from the computing device(s) 126, input data 142 associated with navigating the vehicle 104. For instance, the computing device(s) 126 may continue to receive new sensor data from the vehicle 104 and present new content represented by the new sensor data as the vehicle 104 navigates through the environment 106. The teleoperator 128 may then further analyze the new content to determine that the vehicle 104 should continue proceeding through the environment 106. For example, the teleoperator 128 may determine that the traffic sign 112 still indicates "SLOW." Based on the determination, the teleoperator 128 may continue to input guidance for the vehicle 104 to proceed through the environment 106. In the example of FIGS. 1A-1B, the teleoperator 128 continues to input the command by continuing to activate the input device associated with the computing device(s) 126, which is represented by 144.

In some examples, and as illustrated by the example of FIGS. 1A-1B, the computing device(s) 126 may continue to send input data 142 to the vehicle 104 while the teleoperator continues to activate the input device, where the input data 142 indicates that the input device is still receiving the input from the teleoperator 128. However, in other examples, the computing device(s) 126 may not continue sending the input data 142. Rather, the computing device(s) 126 may send new guidance data indicating that the vehicle 104 is to stop if the teleoperator 128 released the input device. The vehicle 104 would then receive the new guidance data from the computing device(s) 126 and determine one or more actions for safely stopping the vehicle 104.

At operation 146, the process 100 may include causing the vehicle 104 to continue navigating around the flagger 108. For instance, based on receiving the second guidance data 142, the vehicle 104 may continue to navigate along the path 138 and passed the flagger 108. The vehicle 104 may further determine another path 148 that is passed the zone at which the flagger 108 is directing the traffic and navigate alone the other path 148. In some examples, once through the zone, the vehicle 104 may no longer communicate with the teleoperator 128 in order to perform the collaborative driving.

While the example of FIGS. 1A-1B describes the teleoperator 128 as continuing to analyze the new content in order to determine when the vehicle 104 should proceed, in other examples, the vehicle 104 may additionally, and/or alternatively, make these determinations. For example, while receiving the input data 142, the vehicle 104 may analyze the sensor data in order to determine the state of the traffic sign 112. In such an example, the vehicle 104 may continue to navigate if the vehicle 104 continues to receive the input data 142 from the computing device(s) 126 and the traffic sign 112 stays in a first state, such as "SLOW." However, the vehicle 104 may perform one or more actions, such as safely stopping, if the traffic sign 112 switches to a second state, such as "STOP," even if the vehicle 104 continues to receive the input data 142. In such an example, the vehicle 104 may proceed using such techniques based a policy for which the vehicle 104 is following. For instance, and as discussed above, the policy may indicate that the vehicle 104 is to navigate when the traffic sign 112 is in the first state and stop when the traffic sign 112 is in the second state.

As discussed above, the teleoperator 128 may use the computing device(s) 126 to provide the guidance to the vehicle 104. As such, FIG. 2 illustrates an example of a user interface 202 that the teleoperator 128 may use to provide the guidance. As shown, the user interface 202 may include at least content 204 represented by the sensor data that is received from the vehicle 104. In the example of FIG. 2, the content 202 includes a video captured by one or more cameras. However, in other examples, the content may be captured by one or more other sensors of the vehicle 104.

The user interface 202 may further include a view 206 of the environment for which the vehicle 104 is navigating. In the perception view 206, objects in the scene may be classified and labeled with textual and/or color-coded classifications. For instance, in the example of FIG. 2, the view 206 includes textual classifications for the vehicle 104, the person (e.g., the flagger 108), the traffic sign 112, the traffic cones 114 (although only one is labeled for clarity reasons), and the stopping line 120 generated by the vehicle 104. However, in other examples, the perception 206 may include color-coded classifications for the objects.

In some examples, the view 106 further includes an indicator 108 that the person is the flagger 108. While the indicator 208 in the example of FIG. 2 includes a dashed box around the person, in other examples, the view 206 may include any other type of indicator 208 (e.g., a color-coded indicator, a label, etc.). This way, the teleoperator 128 is able to use the user interface 202 and quickly determine which person the vehicle 104 determined as being the flagger 108. The teleoperator 128 is then able to use that determination in order to verify whether the person is actually the flagger 108.

Figure 3:
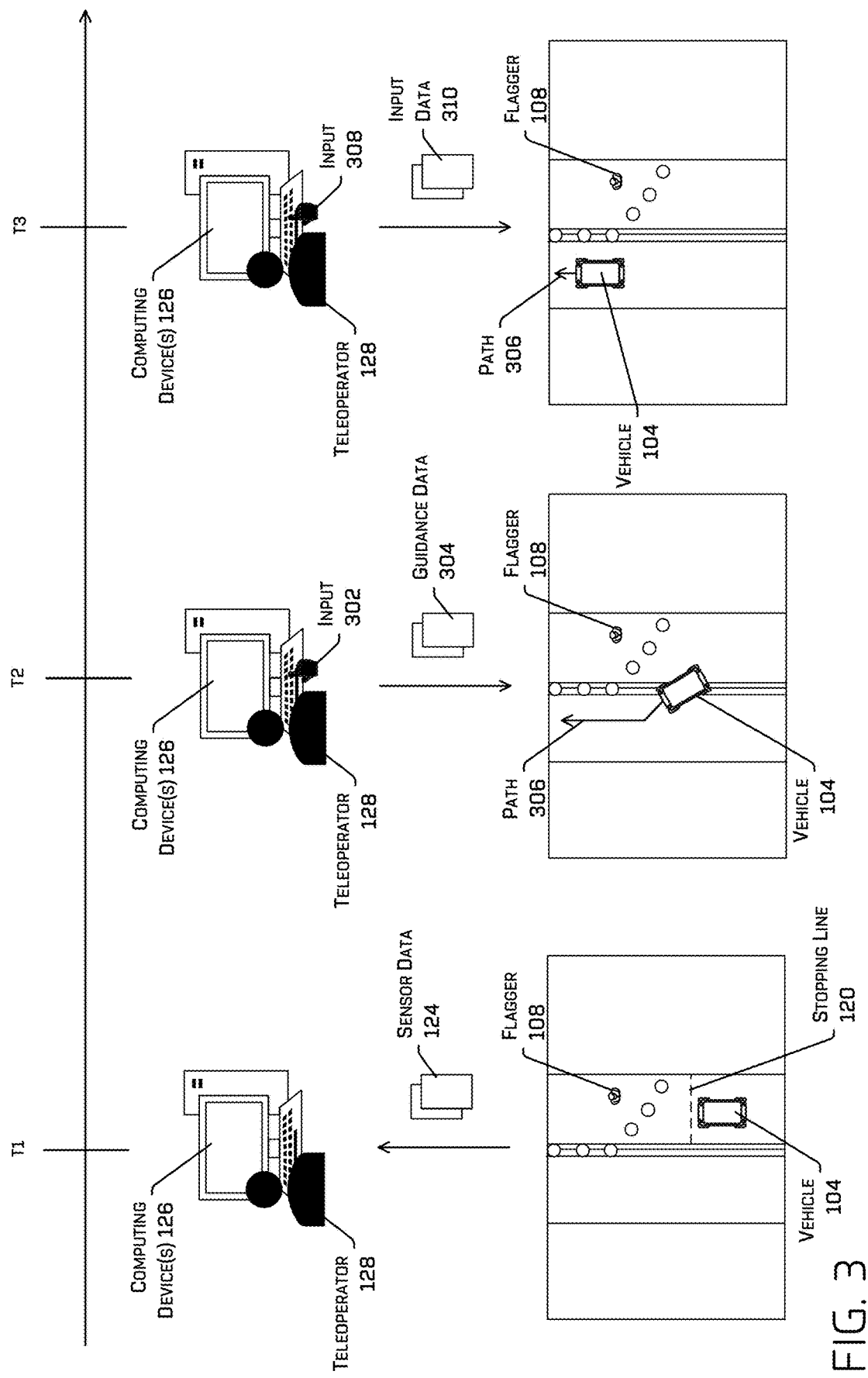
FIG. 3 illustrates a first example of a teleoperator providing guidance to a vehicle to navigate through a zone that includes a flagger directing traffic.

FIG. 3 illustrates an example of the teleoperator 128 providing guidance that cause the vehicle 104 to navigate through a zone that includes the flagger 108 directing traffic. As shown, at a first time (T1), the vehicle 104 may determine that the flagger 108 is located along the path of the vehicle 104. As such, the vehicle 104 may determine the stopping line 120 that is the threshold distance from the flagger 108 and stop near the stopping line 120. Additionally, the vehicle 104 may send at least the sensor data 124 to the computing device(s) 126 associated with the teleoperator 128. The computing device(s) 126 may then use the sensor data 124 in order to provide the user interface 202 to the teleoperator 128.

At a second time (T2), the teleoperator 128 may verify that the person is the flagger 108. Additionally, the teleoperator 128 may use the user interface 202 to determine when the vehicle 104 should begin to navigate through the zone. In some examples, the teleoperator 128 makes the determination based on the traffic sign 112 (e.g., the flagger 108 changes the traffic sign 112 to "SLOW"), a gesture made by the flagger 108 (e.g., the flagger 108 makes a hand motion to proceed), and/or using one or more other techniques. Once the teleoperator 128 determines that it is time for the vehicle 104 to navigate, the teleoperator 128 may provide an input to the computing device(s) 126, such as by activating an input device of the computing device(s) 126, which is represented by 302. In response, the vehicle 104 may receive guidance data 304 indicating that the vehicle 104 is to proceed. The vehicle 104 may then determine a path 306 for navigating through the zone and begin to navigate along the path 306.

Next, at third time (T3), the teleoperator 128 may use the user interface 202 to determine that the vehicle 104 should continue to navigate through the zone. In some examples, the teleoperator 128 makes the determination based on the traffic sign 112 (e.g., the flagger 108 keeps the traffic sign 112 on "SLOW"), the gesture made by the flagger 108 (e.g., the flagger 108 continues making the hand motion to proceed), and/or using one or more other techniques. As such, the teleoperator 128 may continue to provide the input to the computing device(s) 126, such as by continuing to activate the input device of the computing device(s) 126, which is represented by 308. In some examples, and as illustrated by the example of FIG. 3, the computing device(s) 126 may then continue to send input data 310 indicating that the vehicle 104 is to proceed. The vehicle 104 may receive the input data 310 and continue along the path 306 through the zone.

While the example of FIG. 3 illustrates the computing device(s) 126 as continuing to send the input data 310 as long as the teleoperator 128 continues to provide the input, in other examples, the computing device(s) 126 may only send the initial guidance data 304. In such examples, the vehicle 104 may navigate similar to the example of FIG. 3, unless the vehicle 104 receives additional guidance data indicating that the vehicle 104 should stop navigating through the zone from the computing device(s) 126. The vehicle 104 may receive such guidance data if the teleoperator 128 stops providing the input into the computing device(s) 126.

Figure 4:
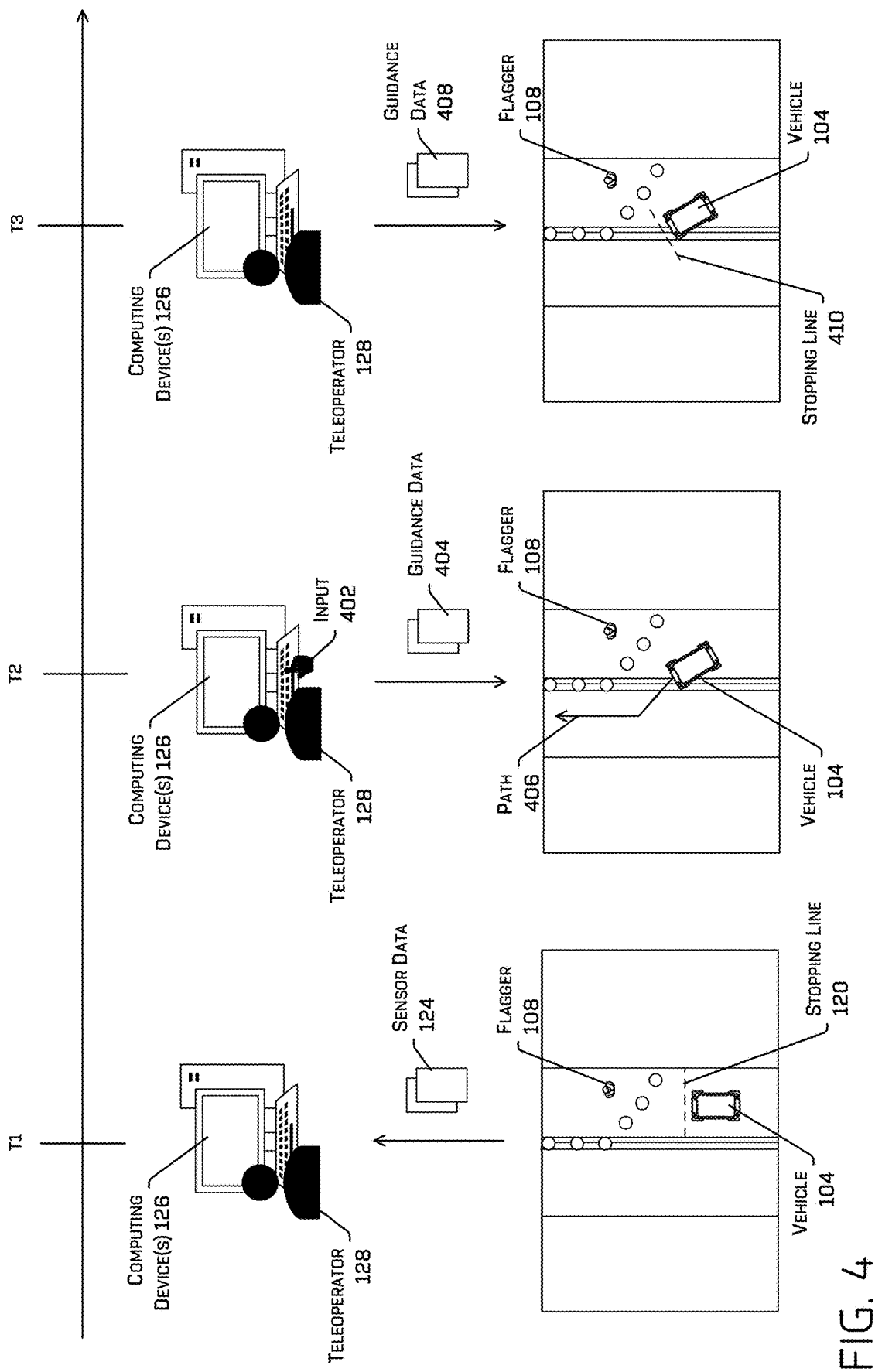
FIG. 4 illustrates a second example of a teleoperator providing guidance to a vehicle to navigate through a zone that includes a flagger directing traffic.

For instance, FIG. 4 illustrates another example of the teleoperator 128 providing guidance that cause the vehicle 104 to navigate through the zone that includes the flagger 108 directing traffic. As shown, at a first time (T1), the vehicle 104 may again determine that the flagger 108 is located along the path of the vehicle 104. As such, the vehicle 104 may determine the stopping line 120 that is the threshold distance from the flagger 108 and stop near the stopping line 120. Additionally, the vehicle 104 may send at least the sensor data 124 to the computing device(s) 126 associated with the teleoperator 128. The computing device(s) 126 may then use the sensor data 124 in order to provide the user interface 202 to the teleoperator 128.

At a second time (T2), the teleoperator 128 may verify that the person is the flagger 108. Additionally, the teleoperator 128 may use the user interface 202 to determine when the vehicle 104 should begin to navigate through the zone. In some examples, the teleoperator 128 makes the determination based on the traffic sign 112 (e.g., the flagger 108 changes the traffic sign 112 to "SLOW"), a gesture made by the flagger 108 (e.g., the flagger 108 makes a hand motion to proceed), and/or using one or more other techniques. Once the teleoperator 128 determines that it is time for the vehicle 104 to navigate, the teleoperator 128 may provide an input to the computing device(s) 126, such as by activating an input device of the computing device(s) 126, which is represented by 402. In response, the vehicle 104 may receive guidance data 504 indicating that the vehicle 104 is to proceed. The vehicle 104 may then determine a path 506 for navigating through the zone and begin to navigate along the path 506.

Next, at third time (T3), the teleoperator 128 may use the user interface 202 to determine that the vehicle 104 should no longer continue to navigate through the zone. In some examples, the teleoperator 128 makes the determination based on the traffic sign 112 (e.g., the flagger 108 changes the traffic sign 112 to "STOP"), a gesture made by the flagger 108 (e.g., the flagger 108 makes a hand motion to stop), and/or using one or more other techniques. As such, the teleoperator 128 may cease providing the input to the computing device(s) 126, such as by no longer activating the input device of the computing device(s) 126, which is represented by the example of FIG. 4. In response, the computing device(s) 126 may then send guidance data 408 indicating that the vehicle 104 is to stop proceeding through the zone. As such, the vehicle 104 may receive the guidance data 408 and determine a new stopping line 410 within the environment. Additionally, the vehicle 104 may then stop at the new stopping line 410.

While the example of FIG. 4 illustrates the computing device(s) 126 as sending the guidance data 408 when the teleoperator stops providing the input, in other examples, the computing device(s) 126 may continue to send input data as long as the teleoperator 128 is providing the input then cease sending the input data when the teleoperator 128 stops providing the input. In such examples, the vehicle 104 may determine to stop when the vehicle 104 stops receiving the input data from the computing device(s) 126.

Figure 5:
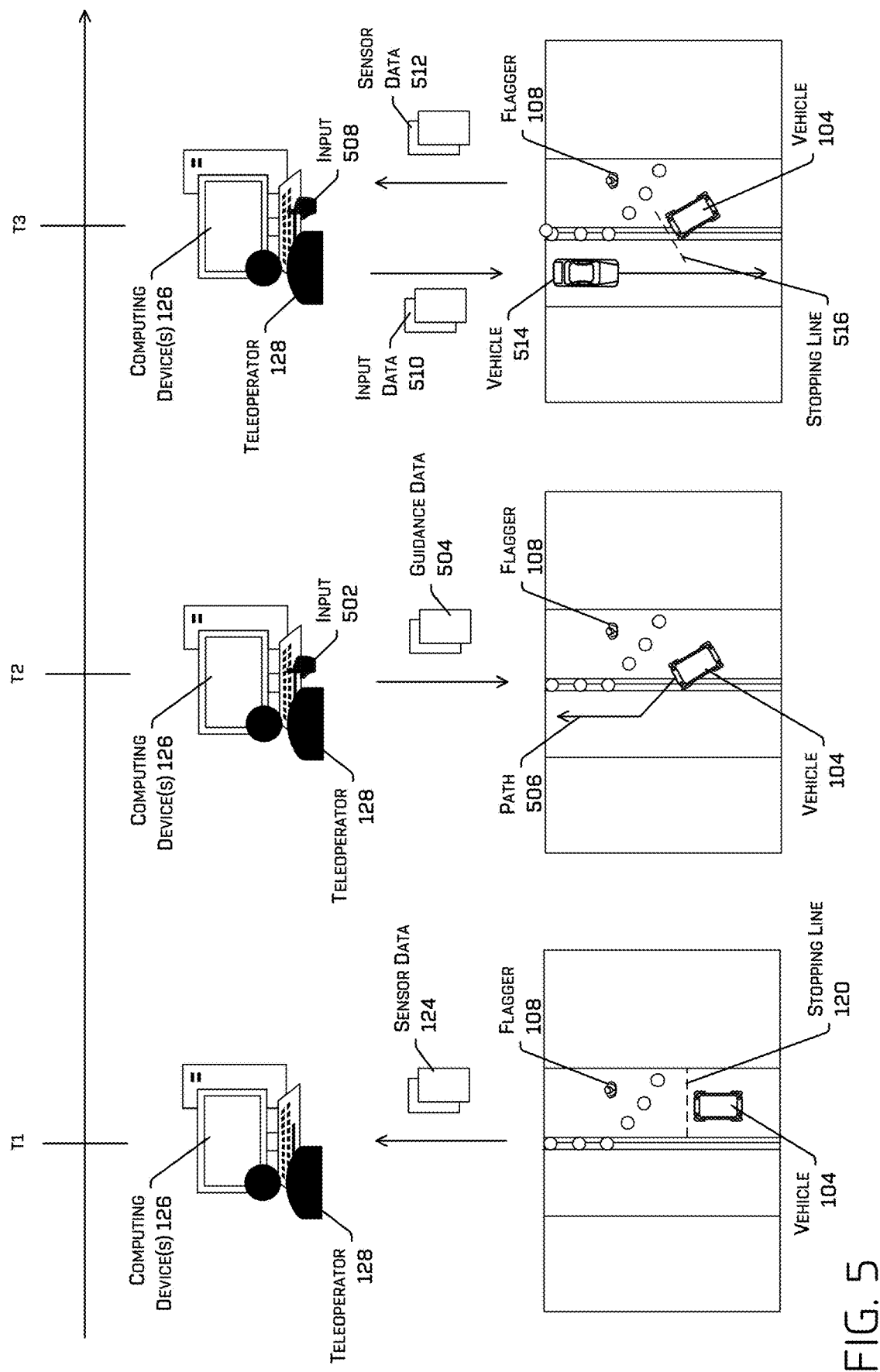
FIG. 5 illustrates a third example of a teleoperator providing guidance to a vehicle to navigate through a zone that includes a flagger directing traffic.

FIG. 5 illustrates another example of the teleoperator 128 providing guidance that cause the vehicle 104 to navigate through a zone that includes the flagger 108 directing traffic. As shown, at a first time (T1), the vehicle 104 may determine that the flagger 108 is located along the path of the vehicle 104. As such, the vehicle 104 may determine the stopping line 120 that is the threshold distance from the flagger 108 and stop near the stopping line 120. Additionally, the vehicle 104 may send at least the sensor data 124 to the computing device(s) 126 associated with the teleoperator 128. The computing device(s) 126 may then use the sensor data 124 in order to provide the user interface 202 to the teleoperator 128.

At a second time (T2), the teleoperator 128 may verify that the person is the flagger 108. Additionally, the teleoperator 128 may use the user interface 202 to determine when the vehicle 104 should begin to navigate through the zone. In some examples, the teleoperator 128 makes the determination based on the traffic sign 112 (e.g., the flagger 108 changes the traffic sign 112 to "SLOW"), a gesture made by the flagger 108 (e.g., the flagger 108 makes a hand motion to proceed), and/or using one or more other techniques. Once the teleoperator 128 determines that it is time for the vehicle 104 to navigate, the teleoperator 128 may provide an input to the computing device(s) 126, such as by activating an input device of the computing device(s) 126, which is represented by 502. In response, the vehicle 104 may receive guidance data 504 indicating that the vehicle 104 is to proceed. The vehicle 104 may then determine a path 506 for navigating through the zone and begin to navigate along the path 506.

Next, at third time (T3), the teleoperator 128 may use the user interface 202 to determine that the vehicle 104 should continue to navigate through the zone. In some examples, the teleoperator 128 makes the determination based on the traffic sign 112 (e.g., the flagger 108 keeps the traffic sign 112 on "SLOW"), the gesture made by the flagger 108 (e.g., the flagger 108 continues to make the hand motion to proceed), and/or using one or more other techniques. As such, the teleoperator 128 may continue to provide the input to the computing device(s) 126, such as by continuing to activate the input device of the computing device(s) 126, which is represented by 508. In some examples, and as illustrated by the example of FIG. 5, the computing device(s) 126 may then continue to send input data 510 indicating that the vehicle 104 is to proceed. The vehicle 104 may receive the input data 510 and continue along the path 506 through the zone.

However, in the example of FIG. 5, while navigating through the zone, the vehicle 104 may continue to generate and analyze sensor data 512 representing the environment. Based on the analysis, the vehicle 104 may determine that there is another object, such as a vehicle 514, located along the path 506 such that there is a probability of collision with the vehicle 514. As such, the vehicle 104 may determine to perform one or more actions in order to avoid the collision, such as stopping. The vehicle 104 may determine to perform these one or more actions even though the teleoperator 128 is still providing the i to navigate through the zone. In other words, even though the vehicle 104 is still receiving the guidance to navigate, the vehicle 104 may still determine how to proceed through the zone and take one or more actions to increase the safety while navigating through the zone. As shown, the vehicle 104 may determine a new stopping line 516 within the environment. The vehicle 104 may then stop at the new stopping line 516.

In some examples, the vehicle 104 may send the sensor data 514 to the computing device(s) 126. Additionally, the vehicle 104 may send, to the computing device(s) 126, data indicating why the vehicle 104 performed the one or more actions. For example, the data may indicate that there is a possible collision with the vehicle 104. This way, the teleoperator 128 is able to continuously determine why the vehicle 104 is performing actions while navigating through the zone associated with the flagger 108.

FIG. 6 is a block diagram of an example system 600 for implementing the techniques described herein. In at least one example, the system 600 may include a vehicle, such as vehicle 602. The vehicle 602 may represent, and/or include, the vehicle 104. The vehicle 602 may include one or more vehicle computing devices 604, one or more sensor systems 606, one or more emitters 608, one or more communication connections 610, at least one direct connection 612, and one or more drive systems 614.

The vehicle computing device(s) 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device(s) 604 stores a localization component 620, a perception component 622, a planning component 624, a prediction component 626, one or more system controllers 628, and one or more maps (represented by map data 630. Though depicted in FIG. 6 as residing in the memory 618 for illustrative purposes, it is contemplated that the localization component 620, the perception component 622, the prediction component 626, the planning component 624, system controller(s) 628, and/or the map(s) 630 may additionally, or alternatively, be accessible to the vehicle 602 (e.g., stored on, or otherwise accessible by, memory remote from the vehicle 602, such as, for example, on memory 632 of one or more remote computing device 634).

In at least one example, the localization component 620 may include functionality to receive sensor data 636 from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data 636 that indicates a presence of an object (e.g., entity) that is proximate to the vehicle 602 and/or a classification of the object as an object type (e.g., car, person, cyclist, animal, building, tree, road surface, curb, sidewalk, unknown, etc.). In some examples, the perception component 622 may provide processed sensor data 636 that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data 636 that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In some examples, the perception component 622 may perform one or more of the processes described herein to determine whether a person is flagger. For instance, in some examples, the perception component 622 may analyze the sensor data representing the person and, based on the analysis, determine one or more characteristics associated with the person. The one or more characteristics may include, but are not limited to, clothing being worn by the person, objects in possession of the person, gestures being made by the person, and/or the like. The perception component 622 may then use the characteristic(s) to determine that the person is likely a flagger. For example, if the characteristic(s) indicate that the person is wearing clothing associated with a construction worker and/or is in possession of objects normally used by construction workers, then the perception component 622 may classify the person as a construction worker flagger. For another example, if the characteristic(s) indicate that the person is wearing clothing associated with a police officer and/or is in possession of objects normally used by police officers, then the perception component 622 may classify the person as a police officer flagger.

In some examples, the perception component 622 may further use classifications of other objects located within the environment to determine that the person is a flagger. For example, the perception component 622 may determine that one or more objects (e.g., tractors, building supplies, construction cones, etc.) located within the environment are associated with construction. As such, the perception component 622 may use that determination in order to further determine that the person is a construction worker flagger. For another example, the perception component 622 may determine that one or more objects (e.g., police cars, police cones, etc.) located within the environment are associated with the police. As such, the perception component 622 may use that determination in order to further determine that the person is a police officer flagger.

The prediction component 626 may generate one or more probability maps representing prediction probabilities of possible locations of one or more objects in an environment. For example, the prediction component 626 may generate one or more probability maps for vehicles, persons, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the vehicle 602 along at least a portion of the route from the first location to the second location. In at least one example, the planning component 624 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle.

In other examples, the planning component 624 may alternatively, or additionally, use data from the localization component 620, the perception component 622, and/or the prediction component 626 to determine a path for the vehicle 602 to follow to traverse through an environment. For example, the planning component 624 may receive data (e.g., object data) from the localization component 620, the perception component 622, and/or the prediction component 626 regarding objects associated with an environment. In some examples, the planning component 624 receives data for relevant objects within the environment. Using this data, the planning component 624 may determine a route to travel from a first location (e.g., a current location) to a second location (e.g., a target location) to avoid objects in an environment. In at least some examples, such a planning component 624 may determine there is no such collision free path and, in turn, provide a path which brings vehicle 602 to a safe stop avoiding all collisions and/or otherwise mitigating damage.

In some examples, the vehicle 602 may include a flagger component 638 that is configured to perform one or more of the processes described herein when a flagger is detected within the environment. For example, the flagger component 638 may use one or more policies for determining how the vehicle 602 is to proceed when the flagger is detected, wherein the one or more policies are represented by policy data 640. For example, a policy may indicate that the vehicle 602 is to stop at least a threshold distance from a flagger that is located along a path of the vehicle 602. As such, the flagger component 638 may use the location of the flagger within the environment and the policy to determine a stopping line that is the threshold distance from the flagger. For another example, a policy may indicate a maximum speed that the vehicle 602 is to travel when navigating through zones associated with flaggers.

The flagger component 638 may further determine when the vehicle 602 is to proceed through the zone associated with the flagger. For example, a policy may indicate that the vehicle 602 is able to proceed (and/or ignore the stopping line) when receiving first guidance data 642 from the computing device(s) 126, where the first guidance data 642 is to proceed. As described herein, the vehicle 602 may receive the first guidance data 642 based on an input device 644 of the computing device(s) 126 receiving an input from the teleoperator 128. The policy may further indicate that the vehicle 602 is to stop when the vehicle 602 ceases receiving the first guidance data 642 and/or receives second guidance data 642 from the computing device(s) 126, where the second guidance data 642 is to stop. As described herein, the vehicle 602 may cease receiving the first guidance data 642 and/or receive the second guidance data 642 based on the input device 644 no longer receiving the input. As such, using the policy, the flagger component 638 may determine when the vehicle 602 is to navigate through a zone associated with the flagger and when the vehicle 602 is to cease navigating through the zone that is associated with the flagger.

In at least one example, the vehicle computing device 604 may include one or more system controllers 628, which may be configured to control steering, propulsion, braking, safety, emitters, communication, and other systems of the vehicle 602. The system controller(s) 628 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planning component 624 to determine a location of the vehicle 602, detect objects in an environment, generate routes, determine actions and/or trajectories to navigate within an environment.

In some examples, the one or more maps 630 may be stored on a remote computing device(s) (such as the computing device(s) 634) accessible via network(s) 646. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine learned techniques. For example, in some instances, the components in the memory 618 (and the memory 632, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally, or in the alternative, the sensor system(s) 606 may send sensor data, via the one or more networks 646, to the computing device(s) 634 and/or the computing device(s) 126 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with persons or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., remote computing device 634, the computing device(s) 126, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device(s) 604 to another computing device or a network, such as network(s) 646. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 626, the planning component 624, the one or more system controllers 628, and the one or more maps 630 may process sensor data 636, as described above, and may send their respective outputs, over the one or more network(s) 646, to the computing device(s) 634 and/or the computing device(s) 126. In at least one example, the localization component 620, the perception component 622, the prediction component 626, the planning component 624, the one or more system controllers 628, and the one or more maps 630 may send their respective outputs to the remote computing device(s) 634 and/or the computing device(s) 126 at a particular frequency, after a lapse of a predetermined period of time, in near real-time, etc.

In some examples, the vehicle 602 may send sensor data 636 to the computing device(s) 634 and/or the computing device(s) 126 via the network(s) 646. In some examples, the vehicle 602 may receive sensor data 636 from the computing device(s) 634 and/or remote sensor system(s) via the network(s) 646. The sensor data 636 may include raw sensor data and/or processed sensor data and/or representations of sensor data. In some examples, the sensor data 636 (raw or processed) may be sent and/or received as one or more log files.

The computing device(s) 634 may include processor(s) 648 and the memory 632. In some examples, the memory 632 may store one or more of components that are similar to the component(s) stored in the memory 618 of the vehicle 602. In such examples, the computing device(s) 634 may be configured to perform one or more of the processes described herein with respect to the vehicle 602.

As further illustrated in the example of FIG. 6, the computing device(s) 126 may include processor(s) 650, input/output device(s) 644, display(s) 652, communication connection(s) 654, and memory 656. The input/output device(s) 644 may include, but are not limited to, keyboard(s), button(s), speaker(s), microphone(s), and/or any other type of input device or output device. For example, in some examples, the input/output device(s) 644 may include at least a keyboard that the teleoperator 128 uses to provide guidance to the vehicle 602.

Additionally, the communication connection(s) 654 may allow the computing device(s) 126 to communicate with other nearby computing device(s) (e.g., the vehicle 602, the computing device(s) 634, other nearby vehicles, etc.) and/or one or more remote sensor system(s) for receiving sensor data 636 and sending guidance data 642. The communications connection(s) 654 may include physical and/or logical interfaces for connecting the computing device(s) 126 to a network, such as network(s) 646. For example, the communications connection(s) 654 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

The memory 656 may store a user interface component 658 that is configured to generate the user interface that the teleoperator 128 uses when providing guidance to the vehicle 602.

The processor(s) 616 of the vehicle 602, the processor(s) 648 of the computing device(s) 634, and the processor(s) 650 of the computing device(s) 126 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 618, the memory 632, and the memory 656 are examples of non-transitory computer-readable media. The memory 618, memory 632, and the memory 656 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 634 and/or components of the computing device(s) 634 may be associated with the vehicle 602. That is, the vehicle 602 may perform one or more of the functions associated with the computing device(s) 634, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
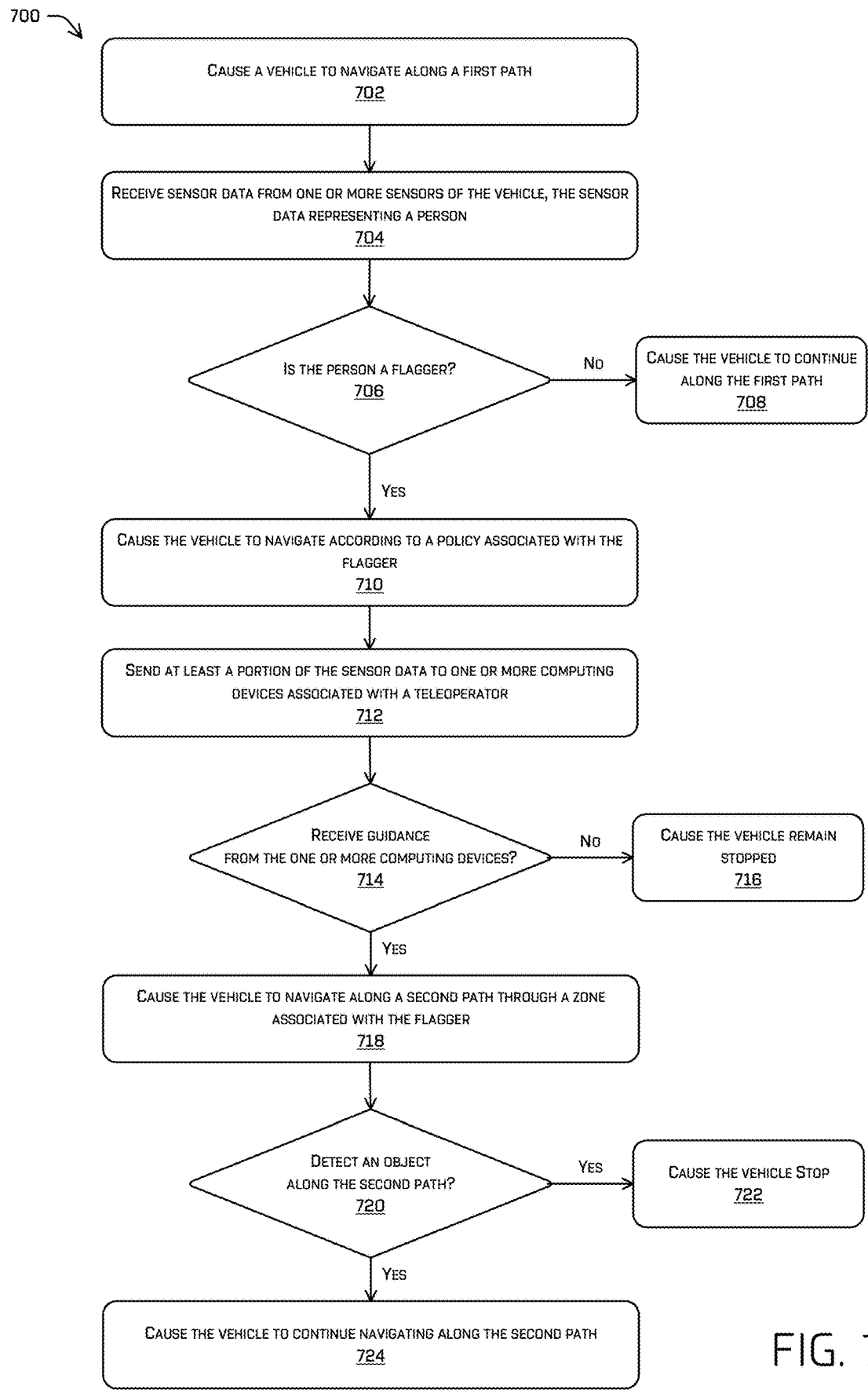
FIG. 7 is an example process for collaboratively navigating a vehicle based at least in part on guidance from a teleoperator.
Figure 8:
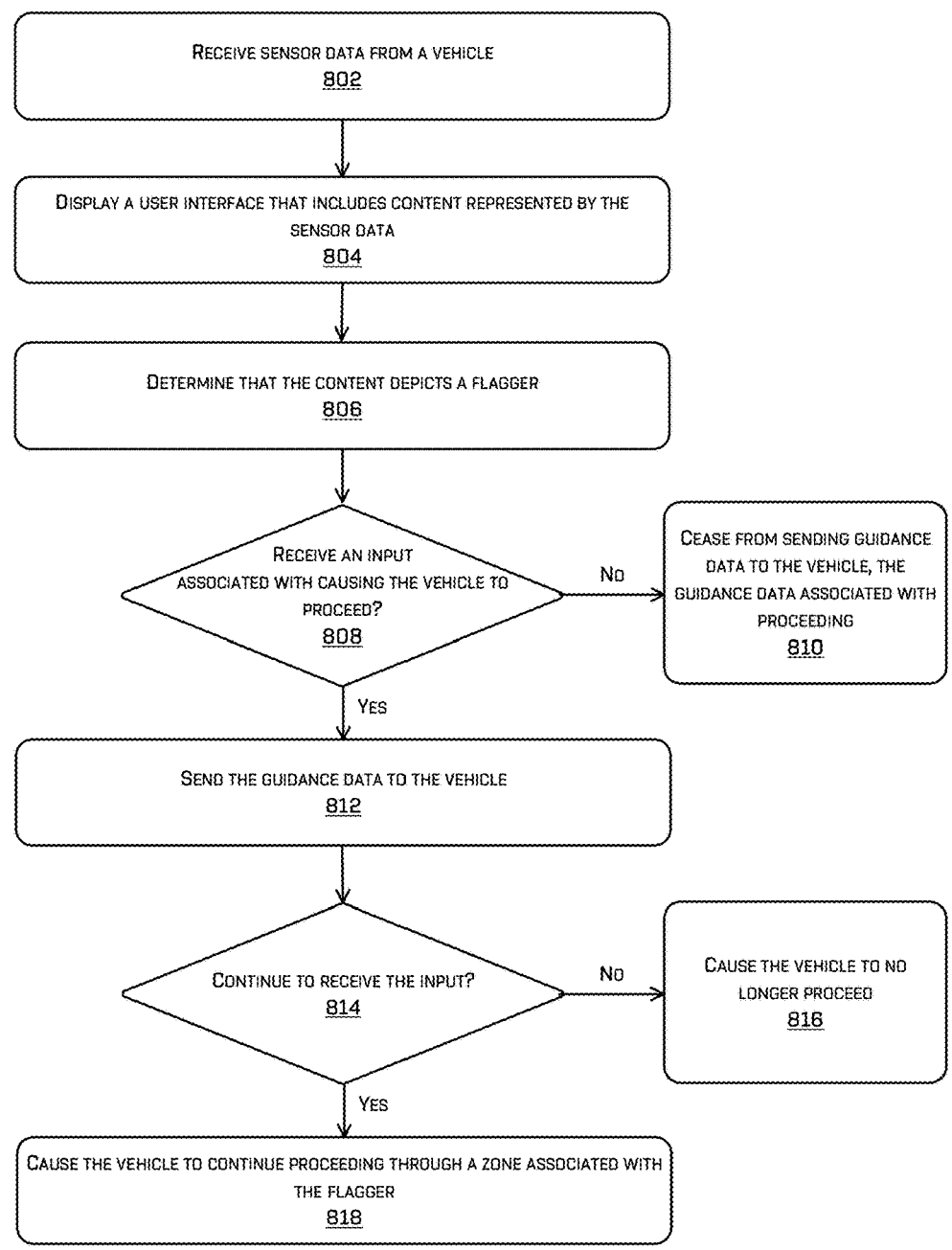
FIG. 8 is an example process for providing guidance to a vehicle that is located proximate to a zone associated with a flagger.

FIGS. 7-8 illustrate example processes in accordance with examples of the disclosure. The process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 7 is an example process 700 for collaboratively navigating a vehicle using a teleoperator. At operation 702, the process 700 may include causing a vehicle to navigate along a first path and at operation 704, the process 700 may include receiving sensor data from one or more sensors of the vehicle, the sensor data representing a person. For instance, the vehicle 602 may be navigating along the first path. While navigating, the vehicle 602 may generate the sensor data using the one or more sensors of the vehicle 602. The sensor data may include, but is not limited to, image data, lidar data, radar data, and/or the like, wherein the sensor data represents the person.

At operations 706, the process 700 may include determining whether the person is a flagger. For instance, the vehicle 602 may analyze the sensor data in order to determine whether the person is a flagger, such as a first responder or a construction worker. In some examples, the vehicle 602 analyzes the sensor data to determine one or more characteristics associated with the person. The one or more characteristics may include, but are not limited to, clothing being worn by the person, objects in possession of the person, gestures being made by the person, and/or the like. The vehicle 602 may then use the characteristic(s) to determine that the person is likely the flagger. Additionally, or alternatively, in some examples, the vehicle 602 may analyze the sensor data to determine classifications of other objects located within the environment around the flagger. The vehicle 602 may then use the classifications of the other objects to determine whether the person is likely the flagger.

If, at operation 706, it is determined that the person is not the flagger, then at operation 708, the process 700 may include causing the vehicle to continue along the first path. For instance, if the vehicle 602 determines that the person is not the flagger, then the vehicle 602 may continue along the first path. Additionally, in some examples, the process 700 may repeat starting back at operation 702.

However, if at operation 706, it is determined that the person is the flagger, then at operation 710, the process 700 may include causing the vehicle to navigate according to a policy associated with the flagger. For instance, if the vehicle 602 determines that the person is the flagger, then the vehicle 602 may use a first policy to determine to stop at a location (e.g., a stopping line) that is at least the threshold distance from the flagger. In some examples, the first policy may indicate that the vehicle 602 is to remain stopped until receiving guidance from the teleoperator 128 to proceed. Additionally, in some examples, the vehicle 602 may use one or more additional, and/or alternative, policies described herein.

As such, and at operation 712, the process 700 may include sending at least a portion of the sensor data to one or more computing devices associated with a teleoperator. For instance, based on determining that the person is the flagger, the vehicle 602 may send the sensor data to the computing device(s) 126 associated with the teleoperator 128. In some examples, the vehicle 602 sends additional data to the computing device(s) 126, such as data indicating which person represented by the sensor data is the flagger. For example, the vehicle 602 may send, to the computing device(s) 126, data representing a cropped image of the person that the vehicle 602 determines as being the flagger.

At operation 714, the process 700 may include determining whether guidance is received from the one or more computing devices. For instance, the vehicle 602 may determine whether the vehicle 602 has received guidance data from the computing device(s) 126. In some examples, the guidance data indicates that the vehicle should proceed through the zone associated with the flagger. Additionally, in some examples, the guidance data indicates that the vehicle 602 may navigate passed the location (e.g., the stopping line) at which the vehicle 602 originally stopped. In some examples, the vehicle 602 receives the guidance data based on the teleoperator 128 providing input to an input device of the computing device(s) 126.

If, at operation 714, it is determined that the guidance has not been received from the one or more computing devices, then at operation 716, the process 700 may include causing the vehicle to remain stopped. For instance, if the vehicle 602 determines that the vehicle 602 has yet to receive the guidance data from the computing device(s) 126, then the vehicle 602 may determine to remain stopped at the location that is at least the threshold distance from the flagger. In other words, the vehicle 602 may continue to follow the policy associated with the flagger.

However, if, at operation 714, it is determined that the guidance has been received from the one or more computing devices, then at operation 718, the process 700 may include causing the vehicle to navigate along a second path through a zone associated with the flagger. For instance, if the vehicle 602 determines that the vehicle 602 has received the guidance data from the computing device(s) 126, then the vehicle 602 may determine update the first policy in order to navigate passed the location (e.g., the stopping line) that is the threshold distance from the flagger. The vehicle 602 may then determine the second path through the zone. In some examples, the vehicle 602 uses one or more components of the vehicle 602 to determine the second path. In some examples, the vehicle 602 receives, from the computing device(s) 126, data representing the second path. In either of the examples, the vehicle 602 may then navigate along the second path.

In some examples, the vehicle 602 may continue along the second path as long as the vehicle 602 continues to receive the guidance data from the computing device(s) 126. In some examples, the vehicle 602 may continue along the second path unless the vehicle 602 receives, from the computing device(s) 126, additional guidance data associated with stopping the vehicle 104.

At operation 720, the process 700 may include determining whether an object is detected along the second path. For instance, while navigating along the second path, the vehicle 602 may continue to generate sensor data using the one or more sensors. The vehicle 602 may then analyze the sensor data to determine whether there is a potential collision between the vehicle 602 and the object along the second path. In other words, even though the vehicle 602 is receiving guidance to proceed from the computing device(s) 126, the vehicle 602 still process sensor data to safely proceed along the second path.

If, at operation 720, it is determined that there is an object along the second path, then at operation 722, the process 700 may include causing the vehicle to stop. For instance, if the vehicle 602 determines that there is the potential collision with the object along the second path, then the vehicle 602 may determine to stop. For safety reasons, the vehicle 602 may determine to stop even if the vehicle 602 is still receiving the guidance data from the computing device(s) 126. In some examples, the vehicle 602 may then send, to the computing device(s), the sensor data representing the object and/or data indicating why the vehicle 602 has stopped.

However, if, at operation 720, it is determined that the object is not located along the second path, then at operation 724, the process 700 may include causing the vehicle to continue navigating along the second path. For instance, if the vehicle 602 determines that there is not the potential collision along the second path, then the vehicle 602 may continue navigating along the second path. Once the vehicle 602 has navigated through the zone, then the vehicle 602 may no longer communicate with the computing device(s) 126.

FIG. 8 is an example process 800 for providing guidance to a vehicle that is located proximate to a zone associated with a flagger. At operation 802, the process 800 may include receiving sensor data from a vehicle and at operation 804, the process 800 may include displaying a user interface that includes content represented by the sensor data. For instance, the computing device(s) 126 may receive the sensor data from the vehicle 602. In some examples, the computing device(s) 126 may also receive, from the vehicle 602, additional data indicating that the sensor data represents a flagger. The computing device(s) 126 may then display a user interface that includes content represented by the sensor data. For instance, the content may include a video represented by the sensor data.

At operation 806, the process 800 may include determining that the content depicts a flagger. For instance, the computing device(s) 126 may determine that the content depicts the flagger. In some examples, the computing device(s) 126 make the determination based on the additional data that is received from the vehicle 602. In some examples, the computing device(s) 126 make the determination based on receiving, from the teleoperator 128, input indicating that the content depicts the flagger. In such examples, the computing device(s) 126 may then send, to the vehicle 602, data indicating that the flagger is located proximate to the vehicle 602. This way, the vehicle 602 is able to begin following one or more policies associated with flaggers.

At operation 808, the process 800 may include determining whether an input associated with causing the vehicle to proceed has been received. For instance, the computing device(s) 126 may determine whether the teleoperator 128 has provided an input associated with causing the vehicle 602 to proceed. In some examples, the computing device(s) 126 receive the input using an input device associated with the computing device(s) 126. For instance, the input may include the teleoperator 128 activating the input device.

If, at operation 808, it is determined that the input has not been received, then at operation 810, the process 800 may include ceasing from sending guidance data to the vehicle, the guidance data associated with proceeding. For instance, if the computing device(s) 126 determine that the input has yet to be received, then the computing device(s) 126 may cease from sending the guidance data to the vehicle 602. This way, the vehicle 602 will continue to operate according to a policy that causes the vehicle 602 to stop at a location (e.g., a stopping line) that is at least a threshold distance from the flagger. In some examples, the computing device(s) 126 may not yet receive the input based on the teleoperator 128 determining, using the user interface, that the flagger has not told the vehicle 602 to proceed.

However, if, at operation 808, it is determined that the input has been received, then at operation 812, the process 800 may include sending the guidance data to the vehicle. For instance, if the computing device(s) 126 determine that the input has been received, then the computing device(s) 126 may send the guidance data to the vehicle 602. In some examples, the guidance data causes the vehicle 602 to begin navigating past the location (e.g., the stopping line) that is at least the threshold distance from the flagger. In some examples, the computing device(s) 126 may receive the input based on the teleoperator 128 determining, using the user interface, that the flagger has told the vehicle 602 to proceed.

At operation 814, the process 800 may include determining whether the input is continued being received. For instance, the computing device(s) 126 may determine whether the teleoperator 128 is continuing to provide the input. In some examples, the computing device(s) 126 continue receiving the input using the input device associated with the computing device(s) 126. For instance, the input may include the teleoperator 128 continuing to activate the input device.

If, at operation 814, it is determined that the input is no longer being received, then at operation 816, the process 800 may include causing the vehicle to no longer proceed. For instance, if the computing device(s) 126 determine that the input is no longer being received, then the computing device(s) 126 may cause the vehicle 602 to no longer proceed. In some examples, the computing device(s) 126 cause the vehicle 602 to no longer proceed by sending, to the vehicle 602, additional guidance data that causes the vehicle 602 to stop. In some examples, the computing device(s) 126 cause the vehicle 602 to no longer proceed by no longer sending the guidance data to the vehicle 602.

However, if, at operation 814, it is determined that the input is still being received, then at operation 818, the process 800 may include causing the vehicle to continue proceeding through a zone associated with the flagger. For instance, if the computing device(s) 126 determine that the input is still being received, then the computing device(s) 126 may cause the vehicle 602 to continue proceeding through the zone. In some examples, the computing device(s) 126 cause the vehicle 602 to continue proceeding through the zone by continuing to send the guidance data to the vehicle 602. In some examples, the process 800 may continue to repeat starting at operation 814.

EXAMPLE CLAUSES

A: A system comprising: one or more processors; and one or more non-transitory computer-readable media storing instructions that, when executed by the one or more processors, cause the system to perform operations comprising: receiving sensor data from one or more sensors associated with a vehicle; determining a probability that the sensor data represents a flagger located along a path of the vehicle; based at least in part on the probability that the sensor data represents the flagger exceeding a threshold probability, sending first data associated with the flagger to one or more computing devices associated with a teleoperator; determining, based at least in part on a rule associated with the flagger, a stopping location that is at least a threshold distance from the flagger; causing the vehicle to not exceed the stopping location; receiving, from the one or more computing devices, guidance data indicative of the teleoperator activating an input device associated with navigating the vehicle; updating a policy of the vehicle based at least in part on the guidance data; and causing, based at least in part on the policy, the vehicle to navigate past the stopping location.

B: The system as recited in Paragraph A, the operations further comprising: receiving, from the one or more computing devices, additional guidance data indicative of the teleoperator releasing the input device; and based at least in part on the additional guidance data, causing the vehicle to again stop while operating based at least in part on the policy.

C: The system as recited in Paragraph A or Paragraph B, the operations further comprising: receiving, from the one or more computing devices, additional guidance data indicative of the teleoperator continuing to activate the input device; and based at least in part on the additional guidance data, causing the vehicle to continue to navigate while the input device remains activated and based at least in part on the policy.

D: The system as recited in any one of Paragraphs A-C, wherein the first data associated with the flagger comprises at least one of: at least a portion of the sensor data; an indication that a person represented by the at least the portion of the sensor data represents the flagger; or image data representing an image of the flagger.

E: A method comprising: receiving sensor data from one or more sensors associated with a vehicle, the sensor data associated with an environment of the vehicle; detecting, based at least in part on the sensor data, a flagger within the environment; based at least in part on detecting the flagger, sending first data to a computing device associated with a teleoperator, wherein the first data is associated with the flagger; determining a policy, associated with the flagger, for navigating the vehicle; receiving, from the computing device, guidance data indicative of the teleoperator activating an input device associated with updating the policy; and based at least in part on receiving the guidance data, causing the vehicle to navigate according to the updating of the policy.

F: The method as recited in Paragraph E, wherein: the policy indicates that the vehicle is to stop at a location that is at least a threshold distance from the flagger; the method further comprises causing, based at least in part on the policy, the vehicle to stop at the location; and causing the vehicle to navigate according to the updating of the policy comprises causing the vehicle to navigate passed the location.

G: The method as recited in Paragraph E or Paragraph F, further comprising: determining, based at least in part on the policy, a stopping line that is at least a threshold distance from the flagger, wherein: receiving the guidance data occurs before the vehicle arrives at the stopping line; and causing the vehicle to navigate according to the updating of the policy comprises causing the vehicle to navigate passed the stopping line without stopping.

H: The method as recited in any one of Paragraphs E-G, wherein the first data associated with the flagger comprises at least one of: at least a portion of the sensor data; an indication that a person represented by the at least the portion of the sensor data represents the flagger; or image data representing an image of the flagger.

I: The method as recited in Paragraph H, further comprising: determining that the vehicle has not received, from the computing device, second data indicative of the teleoperator activating the input device; and causing the vehicle to stop.

J: The method as recited in Paragraph H, further comprising: receiving, from the computing device, second data indicative of the teleoperator continuing to activate the input device; and based at least in part on the second data, causing the vehicle to continue to navigate according to the updating of the policy.

K: The method as recited in any one of Paragraphs E-J, further comprising: receiving, from the computing device, a verification that the flagger is within the environment, wherein determining the policy is based at least in part on the verification.

L: The method as recited in any one of Paragraphs E-K, wherein the policy includes interacting with a traffic sign that includes multiple states, the vehicle to perform a first action when the traffic sign is in a first state and perform a second action when the traffic sign is in a second state.

M: The method as recited in any one of Paragraphs E-L, wherein the policy includes interacting with the flagger that performs multiple gestures, the vehicle to perform a first action when the flagger performs a first gesture and a second action when the flagger performs a second gesture.

N: The method as recited in any one of Paragraphs E-M, further comprising: while causing the vehicle to navigate, receiving additional sensor data generated by the one or more sensors; detecting, based at least in part on the additional sensor data, a potential collision with an object; and based at least in part on the potential collision, causing the vehicle to at least one of: navigate according to a deviation from the policy; or navigate according to a deviation from a signal of the flagger.

O: The method as recited in any one of Paragraphs E-N, wherein the flagger comprises at least one of: a person; or a traffic sign.

P: One or more non-transitory computer-readable media storing instructions that, when executed by one or more processors, cause the one or more processors to perform operations comprising: receiving sensor data from one or more sensors associated with a vehicle, the sensor data associated with an environment of the vehicle; detecting, based at least in part on the sensor data, a flagger within the environment; based at least in part on detecting the flagger, sending first data to a computing device associated with a teleoperator, wherein the first data is associated with the flagger; determining a policy, associated with the flagger, for navigating the vehicle; receiving, from the computing device, guidance data indicative of the teleoperator activating an input device associated with updating the policy; and based at least in part on receiving the guidance data, causing the vehicle to navigate according to the updating of the policy.

Q: The one or more non-transitory computer-readable media as recited in Paragraph P, wherein: the policy indicates that the vehicle is to stop at a location that is at least a threshold distance from the flagger; the method further comprises causing, based at least in part on the policy, the vehicle to stop at the location; and causing the vehicle to navigate according to the updating of the policy comprises causing the vehicle to navigate passed the location.

R: The one or more non-transitory computer-readable media as recited in Paragraph P or Paragraph Q, the operations further comprising: determining, based at least in part on the policy, a stopping line that is at least a threshold distance from the flagger, wherein: receiving the guidance data occurs before the vehicle arrives at the stopping line; and causing the vehicle to navigate according to the updating of the policy comprises causing the vehicle to navigate passed the stopping line without stopping.

S: The one or more non-transitory computer-readable media as recited in any one of Paragraphs P-R, wherein the first data associated with the flagger comprises at least one of: at least a portion of the sensor data; an indication that a person represented by the at least the portion of the sensor data represents the flagger; or image data representing an image of the flagger.

T: The one or more non-transitory computer-readable media as recited in any one of Paragraphs P-S, wherein the policy indicates that the vehicle is to stop at least a threshold distance from the flagger until receiving the guidance data.

While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving sensor data from one or more sensors associated with a vehicle;
determining a probability that the sensor data represents a flagger located along a path of the vehicle;
based at least in part on the probability that the sensor data represents the flagger exceeding a threshold probability, initiating a guidance session with one or more computing devices associated with a teleoperator by sending first data associated with the flagger to one or more computing devices associated with a teleoperator;
determining, based at least in part on a rule associated with the flagger, a first stopping location that is at least a threshold distance from the flagger;
causing the vehicle to not exceed the first stopping location;
receiving, from the one or more computing devices and during the guidance session, first guidance data indicative of the teleoperator activating an input device associated with navigating the vehicle;
updating a policy of the vehicle based at least in part on the first guidance data;
causing, based at least in part on the updated policy, the vehicle to navigate past the first stopping location;
receiving, from the one or more computing devices and during the guidance session, second guidance data indicative of the teleoperator releasing the input device; and
based at least in part on receiving the second guidance data, causing the vehicle to not exceed a second stopping location at least until the vehicle receives additional guidance data, wherein the second stopping location is an intermediate location between the first stopping location and a third location outside a zone associated with the flagger.

2. The system as recited in claim 1, the operations further comprising:
receiving, from the one or more computing devices, third guidance data indicative of the teleoperator reactivating the input device; and
based at least in part on the third guidance data, causing the vehicle to continue to navigate while the input device remains activated and based at least in part on the policy.

3. The system as recited in claim 1, wherein the first data associated with the flagger comprises at least one of:
at least a portion of the sensor data;
an indication that a person represented by the at least the portion of the sensor data represents the flagger; or
image data representing an image of the flagger.

4. The system of claim 1, wherein the additional guidance data is indicative of the teleoperator reactivating the input device.

5. A method comprising:
receiving sensor data from one or more sensors associated with a vehicle, the sensor data associated with an environment of the vehicle;
detecting, based at least in part on the sensor data, a flagger within the environment;
based at least in part on detecting the flagger, initiating a guidance session with a teleoperator by sending first data to a computing device associated with the teleoperator, wherein the first data is associated with the flagger;
determining a policy, associated with the flagger, for navigating the vehicle;
receiving, from the computing device and during the guidance session, first guidance data indicative of the teleoperator activating an input device associated with updating the policy;
based at least in part on receiving the first guidance data, causing the vehicle to navigate according to the updating of the policy;
receiving, from the computing device and during the guidance session, second guidance data indicative of the teleoperator releasing the input device; and
based at least in part on receiving the second guidance data, causing the vehicle to stop at an intermediate location at least until the vehicle receives additional guidance data, wherein the intermediate location is between a first location that is located at least a threshold distance from the flagger and a second location outside a zone associated with the flagger.

6. The method as recited in claim 5, wherein:
the policy indicates that the vehicle is to stop at the first location that is at least the threshold distance from the flagger;
the method further comprises causing, based at least in part on the policy, the vehicle to stop at the first location; and
causing the vehicle to navigate according to the updating of the policy comprises causing the vehicle to navigate passed the first location.

7. The method as recited in claim 5, further comprising:
determining, based at least in part on the policy, a stopping line associated with the first location that is at least the threshold distance from the flagger,
wherein:
receiving the first guidance data occurs before the vehicle arrives at the stopping line; and
causing the vehicle to navigate according to the updating of the policy comprises causing the vehicle to navigate passed the stopping line without stopping.

8. The method as recited in claim 5, wherein the first data associated with the flagger comprises at least one of:
at least a portion of the sensor data;
an indication that a person represented by the at least the portion of the sensor data represents the flagger; or
image data representing an image of the flagger.

9. The method as recited in claim 8, further comprising:
determining that the vehicle has not received, from the computing device, third guidance data indicative of the teleoperator reactivating the input device; and
causing the vehicle to remain stopped.

10. The method as recited in claim 8, further comprising:
receiving, from the computing device, third guidance data indicative of the teleoperator reactivating the input device; and
based at least in part on the third guidance data, causing the vehicle to navigate according to the updating of the policy.

11. The method as recited in claim 5, further comprising:
receiving, from the computing device, a verification that the flagger is within the environment,
wherein determining the policy is based at least in part on the verification.

12. The method as recited in claim 5, wherein the policy includes interacting with a traffic sign that includes multiple states, the vehicle to perform a first action when the traffic sign is in a first state and perform a second action when the traffic sign is in a second state.

13. The method as recited in claim 5, wherein the policy includes interacting with the flagger that performs multiple gestures, the vehicle to perform a first action when the flagger performs a first gesture and a second action when the flagger performs a second gesture.

14. The method as recited in claim 5, further comprising:
while causing the vehicle to navigate, receiving additional sensor data generated by the one or more sensors;
detecting, based at least in part on the additional sensor data, a potential collision with an object; and
based at least in part on the potential collision, causing the vehicle to at least one of:
navigate according to a deviation from the policy; or
navigate according to a deviation from a signal of the flagger.

15. The method as recited in claim 5, wherein the flagger comprises at least one of:
a person; or
a traffic sign.

16. One or more non-transitory computer-readable media storing instructions that, when executed by one or more processors, cause the one or more processors to perform operations comprising:
receiving sensor data from one or more sensors associated with a vehicle, the sensor data associated with an environment of the vehicle;
detecting, based at least in part on the sensor data, a flagger within the environment;
based at least in part on detecting the flagger, initiating a guidance session with a teleoperator by sending first data to a computing device associated with the teleoperator, wherein the first data is associated with the flagger;
determining a policy, associated with the flagger, for navigating the vehicle;
receiving, from the computing device and during the guidance session, first guidance data indicative of the teleoperator activating an input device associated with updating the policy;
based at least in part on receiving the first guidance data, causing the vehicle to navigate according to the updating of the policy;
receiving, from the computing device and during the guidance session, second guidance data indicative of the teleoperator releasing the input device; and
based at least in part on receiving the second guidance data, causing the vehicle to stop at an intermediate location at least until the vehicle receives additional guidance data, wherein the intermediate location is between a first location that is located at least a threshold distance from the flagger and a second location outside a zone associated with the flagger.

17. The one or more non-transitory computer-readable media as recited in claim 16, wherein:
the policy indicates that the vehicle is to stop at the first location that is at least the threshold distance from the flagger;
the operations further comprising causing, based at least in part on the policy, the vehicle to stop at the first location; and
causing the vehicle to navigate according to the updating of the policy comprises causing the vehicle to navigate passed the first location.

18. The one or more non-transitory computer-readable media as recited in claim 16, the operations further comprising:
determining, based at least in part on the policy, a stopping line associated with the first location that is at least the threshold distance from the flagger,
wherein:
receiving the first guidance data occurs before the vehicle arrives at the stopping line; and
causing the vehicle to navigate according to the updating of the policy comprises causing the vehicle to navigate passed the stopping line without stopping.

19. The one or more non-transitory computer-readable media as recited in claim 16, wherein the first data associated with the flagger comprises at least one of:
at least a portion of the sensor data;
an indication that a person represented by the at least the portion of the sensor data represents the flagger; or
image data representing an image of the flagger.

20. The one or more non-transitory computer-readable media as recited in claim 16, wherein the policy indicates that the vehicle is to stop at the first location at least a threshold distance from the flagger until receiving the first guidance data.

* * * * *